(12) United States Patent
Kumar Agrawal et al.

(10) Patent No.: US 12,001,532 B2
(45) Date of Patent: *Jun. 4, 2024

(54) ELECTRONIC DEVICES AND CORRESPONDING METHODS FOR ENROLLING FINGERPRINT DATA AND UNLOCKING AN ELECTRONIC DEVICE

(71) Applicant: Motorola Mobility LLC, Chicago, IL (US)

(72) Inventors: Amit Kumar Agrawal, Bangalore (IN); Caio Luiz Leal Chagas do Nascimento, Campinas (BR); Mahadevan Ayalur, Gurnee, IL (US)

(73) Assignee: Motorola Mobility LLC, Chicago, IL (US)

( * ) Notice: Subject to any disclaimer, the term of this patent is extended or adjusted under 35 U.S.C. 154(b) by 560 days.

This patent is subject to a terminal disclaimer.

(21) Appl. No.: 17/203,614

(22) Filed: Mar. 16, 2021

(65) Prior Publication Data

US 2022/0300589 A1    Sep. 22, 2022

(51) Int. Cl.
| | |
|---|---|
| *G06F 21/32* | (2013.01) |
| *G06F 1/16* | (2006.01) |
| *H04M 1/673* | (2006.01) |
| *G06V 40/12* | (2022.01) |
| *G06V 40/50* | (2022.01) |

(52) U.S. Cl.
CPC ............ *G06F 21/32* (2013.01); *G06F 1/1637* (2013.01); *H04M 1/673* (2013.01); *G06V 40/1365* (2022.01); *G06V 40/50* (2022.01)

(58) Field of Classification Search
CPC ...... G06F 21/32; G06F 1/1637; H04M 1/673; G06V 40/1365; G06V 40/50
See application file for complete search history.

(56) References Cited

U.S. PATENT DOCUMENTS 10,284,759 B2   5/2019   Wang et al.
10,616,460 B2   4/2020   Wang et al.
(Continued)

OTHER PUBLICATIONS

Sarma, Abhishek, "Notice of Allowance", U.S. Appl. No. 17/203,608, filed Mar. 16, 2021; dated Feb. 1, 2022.
Tyagi, et al., "Image Processing as a Function of Deformable Electronic Device Geometry and Corresponding Devices and Methods", U.S. Appl. No. 17/161,573, filed Jan. 28, 2021.
Zhu, Xiafeng, "Electronic Devices and Corresponding Methods for Rotating Graphical Objects Presented on a Display", U.S. Appl. No. 16/517,005, filed Jul. 19, 2019.
(Continued)

*Primary Examiner* — Gerald Johnson
(74) *Attorney, Agent, or Firm* — Philip H. Burrus, IV

(57) ABSTRACT

An electronic device includes a memory storing a plurality of fingerprint reference data files. One or more sensors identify whether a mechanical support condition of the electronic device is a hand supported condition or a surface supported condition. A fingerprint sensor receives fingerprint data. One or more processors select a prioritized fingerprint data reference file from the plurality of fingerprint reference data files as a function of the mechanical support condition and authenticate an authorized user of the electronic device by comparing the fingerprint data to the prioritized fingerprint data reference file before comparing the fingerprint data to another fingerprint reference data file of the plurality of fingerprint reference data files. The fingerprint sensor can be situated on a minor surface of the electronic device, on a rear major surface in a central location, on the rear major surface in an edge location, or in other locations.

20 Claims, 13 Drawing Sheets

(56) References Cited

U.S. PATENT DOCUMENTS

| | | |
|---|---|---|
| 2010/0188353 A1 | 7/2010 | Yoon et al. |
| 2015/0078586 A1 | 3/2015 | Ang |
| 2015/0324570 A1* | 11/2015 | Lee .................. G06V 10/242 |
| | | 382/124 |
| 2016/0147987 A1 | 5/2016 | Jang |
| 2017/0017783 A1 | 1/2017 | Willis |
| 2018/0011590 A1 | 1/2018 | Lee et al. |
| 2019/0012000 A1 | 1/2019 | Cavallaro et al. |
| 2019/0098187 A1 | 3/2019 | Wang |
| 2021/0248347 A1 | 8/2021 | Seo |
| 2021/0368037 A1 | 11/2021 | Zhang |
| 2021/0409539 A1 | 12/2021 | Arellano et al. |
| 2022/0284212 A1* | 9/2022 | Pallerla .................. G06V 40/50 |
| 2023/0026952 A1* | 1/2023 | Han ........................ G06F 21/32 |

OTHER PUBLICATIONS

Townley, Mandy, "GB Search Report and Written Opinion", GB2203113.2; dated Sep. 16, 2022.
Patel, Premal R., "NonFinal Office Action", U.S. Appl. No. 17/868,153, filed Mar. 3, 2022; dated Oct. 27, 2022.
Patel, Premal R, "Notice of Allowance", U.S. Appl. No. 17/203,616, filed Mar. 16, 2021; dated Mar. 2, 2022.
Patel, Premal, "Non-Final Office Action", U.S. Appl. No. 18/107,334, filed Feb. 8, 2023; dated Nov. 1, 2023.
Sarma, Abhishek, "NonFinal Office Action", U.S. Appl. No. 17/686,144, filed Mar. 3, 2022; dated Nov. 2, 2023,.
Sarma, Abhishek, "Non-Final Office Action", U.S. Appl. No. 17/686,144, filed Mar. 3, 2022; dated Apr. 4, 2023,.
Sarma, Abhishek, "Notice of Allowance", U.S. Appl. No. 17/686,144, fFiled Mar. 3, 2022; dated Jul. 20, 2023.

\* cited by examiner

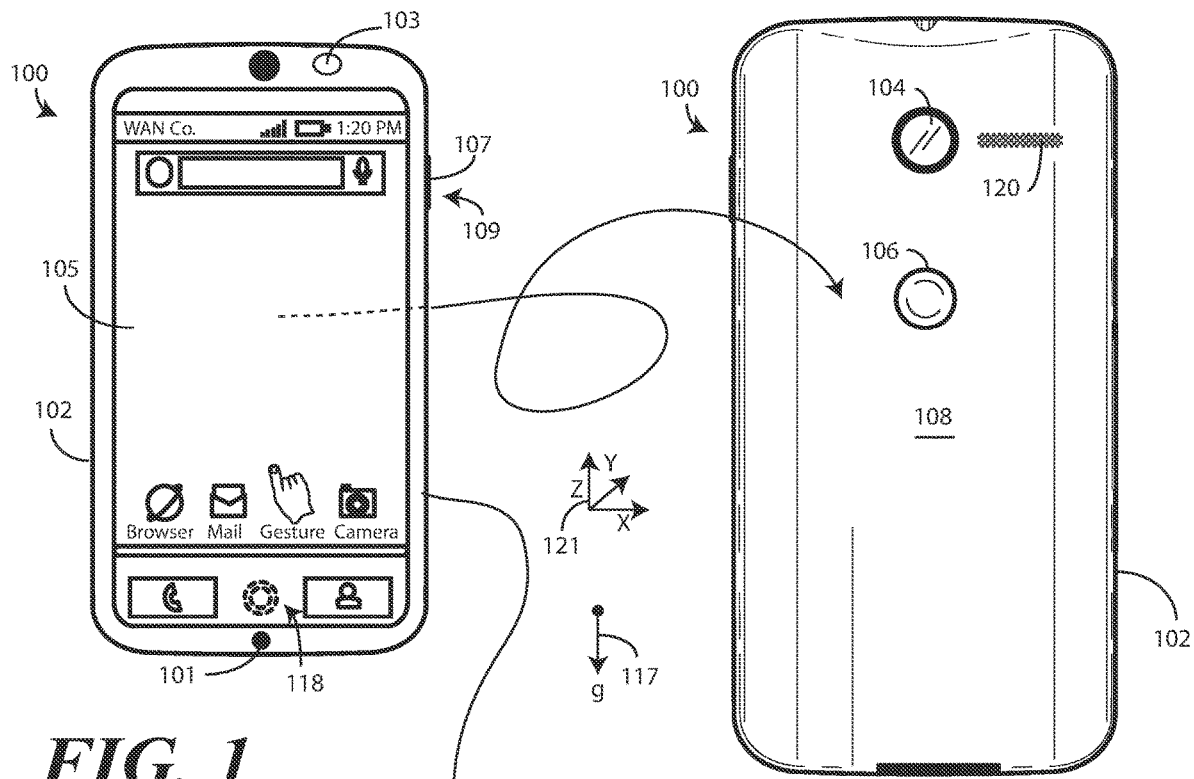
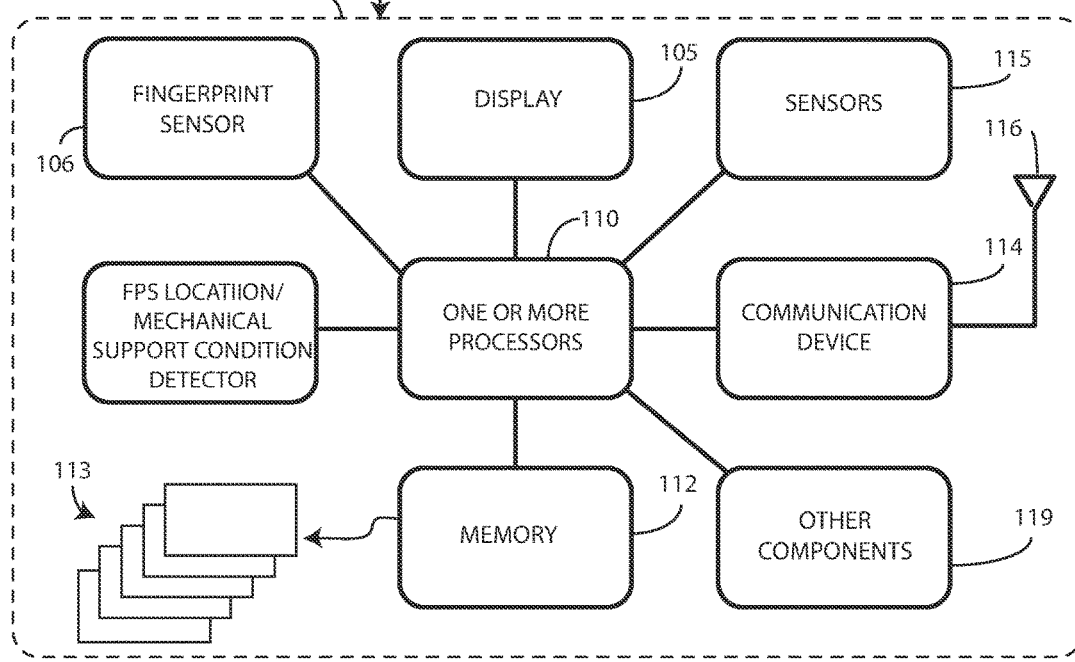
FIG. 1

ELECTRONIC DEVICES AND CORRESPONDING METHODS FOR ENROLLING FINGERPRINT DATA AND UNLOCKING AN ELECTRONIC DEVICE

BACKGROUND

Technical Field

This disclosure relates generally to electronic devices, and more particularly to electronic devices having fingerprint sensors.

Background Art

Portable electronic communication devices such as smartphones and tablet computers have become ubiquitous. People all over the world use such devices to stay connected.

These devices have been designed in various mechanical configurations. A first configuration, known as a "candy bar," is generally rectangular in shape and has a rigid form factor with a continually exposed display positioned on a major face of the electronic device. By contrast, a "clamshell" device has a mechanical hinge that allows one housing to pivot relative to the other, thereby concealing its display when closed and revealing the same when open. Some consumers prefer candy bar devices, while others prefer clamshell devices.

Regardless of device type, most consumers prefer dynamic user interface devices. This preference has led to the use of touch sensitive displays, rather than keyboards, as the primary user interface. Moreover, as display technology has improved, these displays have become increasingly larger. While suitable for serving as the primary user interface devices, most electronic devices require other user interface components such as buttons, biometric sensors, and other devices. It would be advantageous to have an improved electronic device that made the use of these auxiliary user interface devices more efficient.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 1 illustrates explanatory electronic devices configured in accordance with one or more embodiments of the disclosure.

Figure 2:
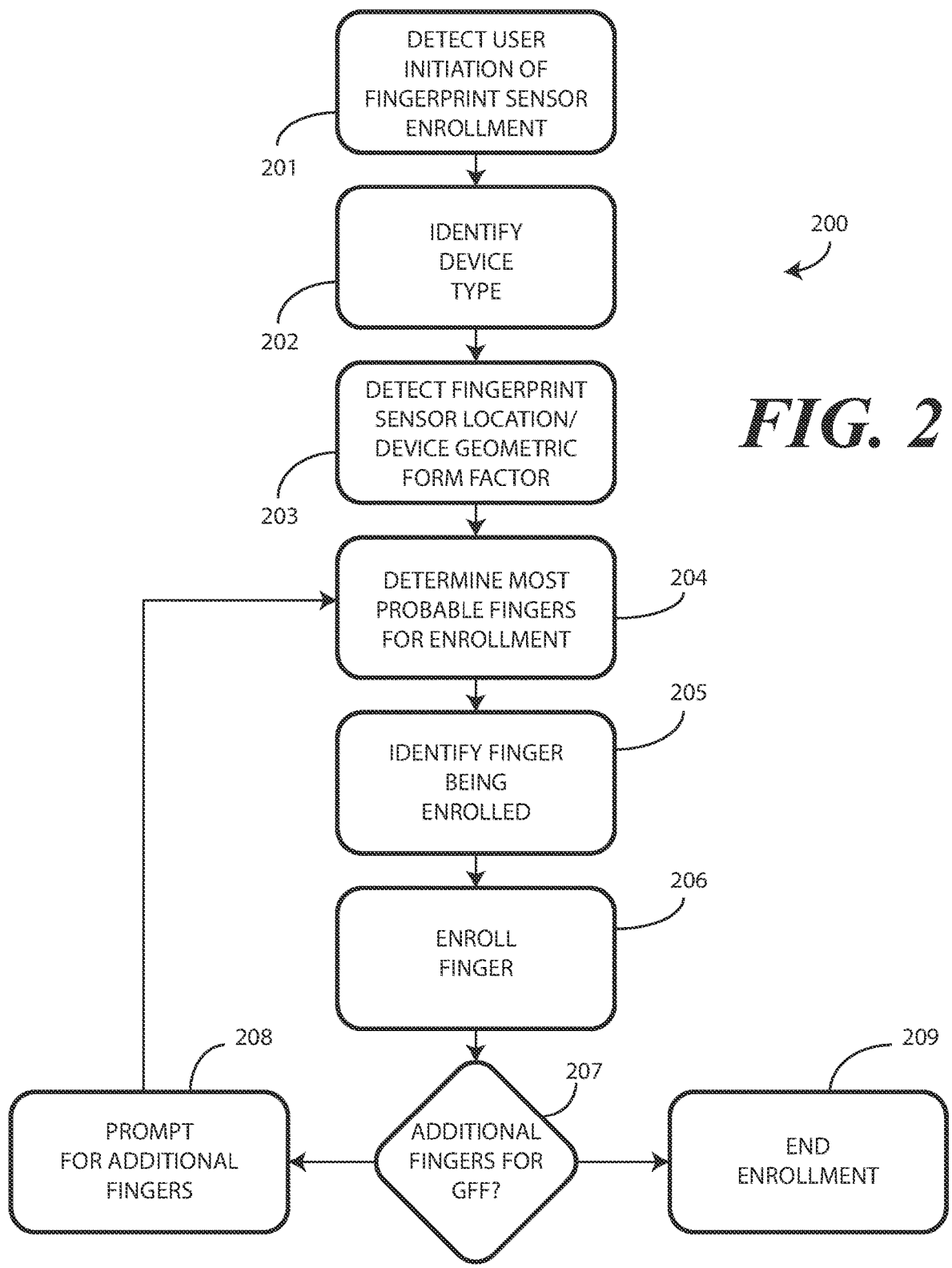
FIG. 2 illustrates one explanatory method in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to detecting a mechanical support condition for an electronic device, receiving fingerprint data, and comparing the fingerprint data to a preselected fingerprint data reference file that is selected as a function of the mechanical support condition before comparing the fingerprint data to any other fingerprint reference data files stored in a memory of the electronic device. Moreover, embodiments of the disclosure provide methods for enrolling preferred fingerprint reference data files to ensure that the most likely used fingerprint reference data files will be stored in the memory for commonly detected mechanical support conditions. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of enrolling preferred fingerprint reference data files so that, upon detecting a mechanical support condition of the electronic device when fingerprint data is received, the fingerprint data can be compared to a preselected fingerprint data reference file before comparing the fingerprint data to any other fingerprint reference data file stored in the memory of the electronic device. The non-processor circuits may include, but are not limited to, a radio receiver, a radio transmitter, signal drivers, clock circuits, power source circuits, and user input devices.

As such, these functions may be interpreted as steps of a method to select a preselected fingerprint data reference file from a plurality of fingerprint reference data files as a function of a mechanical support condition and authenticating an authorized user of the electronic device by comparing the fingerprint data to the preselected fingerprint data reference file before comparing the fingerprint data to any other fingerprint reference data file of the plurality of fingerprint reference data files as described below. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within 1 percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide faster and more efficient methods for authenticating an authorized user of an electronic device using a fingerprint sensor based upon a mechanical support condition of the electronic device when fingerprint data is received. Additionally, embodiments of the disclosure provide methods for ensuring that prioritized or preferred fingerprint data is enrolled and stored as fingerprint reference data files in a memory of the electronic device during an enrollment process. Advantageously, embodiments of the disclosure solve problems associated with situations where the fingerprint sensor might be difficult to reach, as well as in situations where the electronic device is supported by a surface such as a table. Moreover, since the fingerprint sensor can be situated at different locations along the device housing, including on minor surfaces (edges) of the device housing, on a rear major surface, on a front major surface and, optionally, under a display, or in other locations, embodiments of the disclosure make the operation of the fingerprint sensor faster and more efficient by prioritizing the fingers that are most likely to be used as a function of not only the mechanical support condition, but also the fingerprint sensor location on the electronic device as well. As will be described below, gravity and the handedness of a user can also be employed as an input in the prioritized fingerprint reference data file selection process.

In one or more embodiments, a method for enrolling fingerprint data as one or more fingerprint reference data files includes determining that an authorized user of the electronic device is initiating a fingerprint sensor enrollment sequence. In one or more embodiments, one or more processors of the electronic device then determine a device configuration of the electronic device, which may include determining where the fingerprint sensor is situated on the electronic device, e.g., on the rear surface of the electronic device, on a front surface of the electronic device and optionally under a display of the electronic device, on a minor surface of the electronic device, or elsewhere.

In one or more embodiments, an image capture device of the electronic device then determines whether the authorized user is using a right hand or a left hand to perform the fingerprint enrollment process. From this information, the one or more processors of the electronic device ascertain the handedness of the person. It would be unlikely, for example, that an authorized user of an electronic device would initially use a left hand for fingerprint enrollment when they are righthanded, and vice versa. Accordingly, in one or more embodiments the one or more processors can use information from an imager or other sensor to determine a handedness of the user. The imager or other sensors can also be used to determine which finger the user is attempting to enroll as well.

In one or more embodiments, after determining the device category of the electronic device, a fingerprint sensor location of the fingerprint sensor, and a handedness of the authorized user, the one or more processors identify at least two fingerprint reference data file types as a function of these factors. For example, the one or more processors may identify a right thumb and index finger as at least two fingerprint reference data file types as a function of the device category, the fingerprint sensor location, and the handedness of the authorized user.

The one or more processors then detect enrollment of a first fingerprint reference data file type of the at least two fingerprint reference data file types. Once this finger is enrolled, to ensure that both of the at least two fingerprint reference data file types are enrolled, the one or more processors prompting, at a user interface of the electronic device, for enrollment of at least one other fingerprint reference data file type of the at least to fingerprint reference data file types before terminating the enrolling process.

Thereafter, the fingerprint reference data files can be prioritized to make unlocking the electronic device faster, more seamless, and more efficient. In one or more embodiments, the fingerprint reference data files are prioritized as a function of the fingerprint sensor location, the handedness of the user, and/or the mechanical support condition of the electronic device. Illustrating by example, in one embodiment, the one or more processors use one or more sensors to determine a mechanical support condition for the electronic device. The one or more processors also use the one or more sensors to determine a fingerprint sensor location on the electronic device.

When the fingerprint sensor receives the fingerprint data while the electronic device is in the detected mechanical support condition and/or at least one other condition, such as when the fingerprint sensor is located in a predefined condition such as along a minor surface of the electronic device, the one or more processors select one fingerprint reference data file from the at least two fingerprint reference data files as a function of these conditions. Thereafter, the one or more processors authenticate the authorized user of the electronic device by comparing the received fingerprint data to the selected fingerprint reference data file before comparing the fingerprint data to any other fingerprint reference data file stored in the memory.

Thus, the one or more processors can advantageously anticipate that the authorized user will use, for instance, an index finger to authenticate themselves based upon the fingerprint sensor location and the mechanical support condition and compare the fingerprint data to the index finger fingerprint reference data file before comparing the fingerprint data to the thumb fingerprint reference data file in one or more embodiments. This streamlines the authentication process, which makes unlocking the electronic device faster and more efficient. When combined with the enrollment process that ensures that all likely fingers that will be used in the most likely mechanical support conditions and geometric form factors are enrolled, embodiments of the disclosure allow a user to more quickly unlock an electronic device. Embodiments of the disclosure also save power and processor cycles as well. Other advantages offered by embodiments of the disclosure will be described below. Still others will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 of FIG. 1 includes a display 105, which may optionally be touch-sensitive. In an embodiment where the display 105 is touch-sensitive, users can deliver user input to the display 105 as touch input from a finger, stylus, or other objects disposed proximately with the display 105. In one embodiment, the display 105 is configured as an active-matrix organic light emitting diode (AMOLED) display. However, it should be noted that other types of displays, including liquid crystal displays, would be obvious to those of ordinary skill in the art having the benefit of this disclosure.

The explanatory electronic device 100 of FIG. 1 includes a device housing 102. Features can be incorporated into the device housing 102. Examples of such features include a front-facing camera or image capture device 103, a rear-facing camera or image capture device 104, one or more microphones 101, and/or an optional speaker port 120.

In one or more embodiments, the electronic device 100 includes a fingerprint sensor 106. The fingerprint sensor 106 can be situated in different locations along the device housing 102. Embodiments of the disclosure contemplate that there are three principal locations for the fingerprint sensor 106, although others may be used as well. These three principal locations include on a minor surface location 109 of the electronic device 100, such as when the fingerprint sensor 106 is integrated with a user interface component 107, which may be a button, touch sensor, or touch sensitive surface, on a rear major surface 108 of the device housing 102 as shown in FIG. 1, or on a front major surface location 118 that may optionally be located beneath the display 105 of the electronic device 100.

In the illustrative embodiment of FIG. 1, when the fingerprint sensor 106 is situated at the front major surface location 118, it is positioned under the display 105 of the electronic device 100. In other embodiments when the fingerprint sensor 106 is situated at the front major surface location 118, it will be placed to the side of the display 105, rather than beneath the display 105 as shown in FIG. 1. While some features are shown being disposed on the rear major surface 108 of the electronic device 100 in this embodiment, they could be located elsewhere, such as on the front major face, on side minor faces, or in other locations in other embodiments.

When the fingerprint sensor 106 is situated beneath the display 105 at the front major surface location 118, in one or more embodiments a first pixel portion of the display 105 is situated above the fingerprint sensor 106, while a second pixel portion is situated at areas of the display 105 other than those positioned above the fingerprint sensor 106. In one embodiment, the first pixel portion comprises only transparent organic light emitting diode pixels. In another embodiment, the pixels disposed in the first pixel portion comprise a combination of transparent organic light emitting diode pixels and reflective organic light emitting diode pixels. Other configurations will be obvious to those of ordinary skill in the art having the benefit of this disclosure.

In one or more embodiments, the second pixel portion comprises only reflective light emitting diode pixels. Content can be presented on a first pixel portion comprising only transparent organic light emitting diode pixels or sub-pixels or a combination of transparent organic light emitting diode pixels or sub-pixels and reflective organic light emitting diode pixels or sub-pixels. The content can also be presented on the second pixel portion comprising only the reflective organic light emitting diode pixels or sub-pixels.

When fingerprint data is to be delivered to the fingerprint sensor 106, one or more processors 110 of the electronic device 100 can cause the transparent organic light emitting diode pixels or sub-pixels to cease emitting light in one or more embodiments. This cessation of light emission prevents light emitted from the transparent organic light emitting diode pixels or sub-pixels from interfering with light or fingerprint data incident upon the first pixel portion. When the transparent organic light emitting diode pixels or sub-pixels are turned OFF, they become optically transparent in one or more embodiments.

In some embodiments, the second pixel portion will then remain ON when the first pixel portion ceases to emit light. However, in other embodiments the second pixel portion will be turned OFF as well. The fingerprint sensor 106 can then be actuated to capture the fingerprint data and/or an image from the light passing through the transparent organic light emitting diode pixels or sub-pixels. Thereafter, the one or more processors 110 can resume the presentation of data along the first pixel portion of the display 105. In one or more embodiments, this comprises actuating the transparent organic light emitting diode pixels or sub-pixels, thereby causing them to again begin emitting light.

Also illustrated in FIG. 1 is one explanatory block diagram schematic 111 of the electronic device 100. In one or more embodiments, the block diagram schematic 111 is configured as a printed circuit board assembly disposed within the device housing 102 of the electronic device 100. Various components can be electrically coupled together by conductors or a bus disposed along one or more printed circuit boards. It should be noted that the block diagram schematic 111 includes many components that are optional, but which are included in an effort to demonstrate how varied electronic devices configured in accordance with embodiments of the disclosure can be.

Thus, it is to be understood that the block diagram schematic 111 of FIG. 1 is provided for illustrative purposes only and for illustrating components of one electronic device 100 in accordance with embodiments of the disclosure. The block diagram schematic 111 of FIG. 1 is not intended to be a complete schematic diagram of the various components required for an electronic device 100. Therefore, other electronic devices in accordance with embodiments of the disclosure may include various other components not shown in FIG. 1 or may include a combination of two or more components or a division of a particular component into two or more separate components, and still be within the scope of the present disclosure.

In one embodiment, the electronic device 100 includes one or more processors 110. The one or more processors 110 can be a microprocessor, a group of processing components, one or more Application Specific Integrated Circuits (ASICs), programmable logic, or other type of processing device. The one or more processors 110 can be operable with the various components of the electronic device 100. The one or more processors 110 can be configured to process and execute executable software code to perform the various functions of the electronic device 100. A storage device, such as memory 112, can optionally store the executable software code used by the one or more processors 110 during operation.

In one or more embodiments, the one or more processors 110 are responsible for transitioning the electronic device 100 from a locked mode of operation to an active mode of operation. In one or more embodiments, the electronic device 100 includes a security mechanism that places the electronic device 100 in a locked mode of operation to prevent unauthorized users from accessing the electronic device 100 or the data stored in the memory 112. Accordingly, in one or more embodiments the electronic device 100 can be referred to as a "lockable device" in that the one or more processors 110 can selectively actuate a security mechanism that prevents unauthorized persons from accessing or logging on to the electronic device 100. Examples of such mechanisms include password protected login screens, screensavers, voice command login mechanism using voice recognition, voice password entry, and so forth. In the illustrative embodiment of FIG. 1, the security mechanism includes authentication of an authorized user of the electronic device 100 using the fingerprint sensor 106, as will be described in more detail below. Other examples of security mechanisms will be obvious to those of ordinary skill in the art having the benefit of this disclosure.

In the illustrative embodiment of FIG. 1, the electronic device 100 is a lockable device capable of being transitioned between a locked mode of operation and an active mode of operation. A person can authenticate themselves as an authorized user of the electronic device 100 by delivering fingerprint data to the fingerprint sensor 106 for authentication by the one or more processors 110. Using the fingerprint sensor 106, the one or more processors 110 can detect fingerprint data when a person places their finger upon the fingerprint sensor 106. The one or more processors 110 can then compare this received fingerprint data with one or more fingerprint reference data files 113 stored in the memory 112 of the electronic device 100 to determine whether the fingerprint data sufficiently matches one fingerprint reference data file of the one or more fingerprint reference data files 113. Where it does, the one or more processors 110 can transition the electronic device 100 from a locked mode of operation to an active mode of operation. In one or more embodiments, this includes causing the presentation of content to occur on the display 105 when the electronic device 100 is in the active mode of operation.

In one or more embodiments, the one or more processors 110 are further responsible for performing the primary functions of the electronic device 100. For example, in one embodiment the one or more processors 110 comprise one or more circuits operable to present presentation information, such as images, text, and video, on the display 105. The executable software code used by the one or more processors 110 can be configured as one or more modules stored in the memory 112 that are operable with the one or more processors 110. Such modules can store instructions, control algorithms, and so forth.

In one embodiment, the one or more processors 110 are responsible for running the operating system environment. The operating system environment can include a kernel, one or more drivers, and an application service layer, and an application layer. The operating system environment can be configured as executable code operating on one or more processors or control circuits of the electronic device 100.

In one or more embodiments, the one or more processors 110 are responsible for managing the applications of the electronic device 100. In one or more embodiments, the one or more processors 110 are also responsible for launching, monitoring and killing the various applications and the various application service modules. The applications of the application layer can be configured as clients of the application service layer to communicate with services through application program interfaces (APIs), messages, events, or other inter-process communication interfaces.

In one embodiment, the fingerprint sensor 106 includes its own processor to perform various functions, including detecting a finger touching the fingerprint sensor 106, capturing and storing fingerprint data from the finger, detecting user actions across a surface of the fingerprint sensor 106. The processor of the fingerprint sensor 106 can optionally perform at least one pre-processing step while the one or more processors 110 are in a low power or sleep mode in the locked mode of operation. Upon receiving a request from the one or more processors 110 for the fingerprint data, the fingerprint sensor 106 can deliver the fingerprint data to the one or more processors 110. In one or more embodiments the processor of the fingerprint sensor 106 can, as one pre-processing step, perform a preliminary authentication of the user by comparing fingerprint data captured by the fingerprint sensor 106 to a fingerprint reference data file 113 stored in the memory 112. The processor of the fingerprint sensor 106 can be an on-board processor. Alternatively, the processor can be a secondary processor that is external to, but operable with, the fingerprint sensor in another embodiment. Other configurations will be obvious to those of ordinary skill in the art having the benefit of this disclosure.

In one embodiment, the fingerprint sensor 106 can include a plurality of sensors. The fingerprint sensor 106 can be a complementary metal-oxide-semiconductor active pixel sensor digital imager or any other fingerprint sensor. The fingerprint sensor 106 can be configured to capture, with the plurality of sensors, a live scan of a fingerprint pattern from a finger disposed along its surface, and to store this information as fingerprint data from the user's finger. The fingerprint sensor 106 may also be able to capture one or more images with the plurality of sensors. The images can correspond to an area beneath a surface of skin. The fingerprint sensor 106 can compare the fingerprint data or skin images to one or more fingerprint reference data files 113 to authenticate a user in an authentication process.

In this illustrative embodiment, the electronic device 100 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications, and other forms of wireless communication such as infrared technology. The communication circuit 114 can include wireless communication circuitry, one of a receiver, a transmitter, or transceiver, and one or more antennas 116.

In one embodiment, the electronic device 100 includes one or more sensors 115 operable to determine one or more conditions of the electronic device 100. Examples of the conditions that the one or more sensors 115 can detect include a fingerprint sensor location of the electronic device, which hand a user is using to enroll fingerprint data at the electronic device 100, which finger a user is using to enroll fingerprint data at the electronic device 100, a mechanical support condition of the electronic device 100, such as whether the electronic device 100 is being held or is supported by a table or other flat surface, and other conditions.

The one or more processors 110 may generate commands or execute control operations based on information received from the front facing image capture device 103, the rear facing image capture device 104, the one or more sensors 115, and/or the other components 119 of the electronic device 100. The one or more processors 110 may also generate commands or execute control operations based upon information received from a combination of these components. Moreover, the one or more processors 110 may process the received information alone or in combination with other data, such as the information stored in the memory 112.

Illustrating by example, in one or more embodiments the one or more sensors 115 identify whether a mechanical support condition of the electronic device 100 is a hand supported condition or a surface supported condition. This information can be used to streamline the unlocking process. To wit, in one or more embodiments the fingerprint sensor 106 receives fingerprint data while the electronic device 100 is in the mechanical support condition identified by the one or more sensors 115. The one or more processors 110 then select a prioritized fingerprint reference data file from the plurality of fingerprint reference data files 113 stored in the memory 112 as a function of the mechanical support condition for initial use in authenticating a person as an authorized user of the electronic device 100. In one or more embodiments, the one or more processors 110 authenticate an authorized user of the electronic device 100 by comparing the fingerprint data received while the electronic device 100 is in the mechanical support condition to the prioritized fingerprint reference data file before comparing the fingerprint data to any other fingerprint reference data files of the plurality of fingerprint reference data files 113. In one or more embodiments, the one or more processors 110 then unlock the electronic device 100 in response to authenticating the authorized user of the electronic device 100. Other factors determined by the one or more sensors 115 can be used in selecting the prioritized fingerprint reference data file as well, including the fingerprint sensor location on the electronic device 100, the handedness of the user, and so forth.

The one or more sensors 115 used to determine these factors can take various forms. Illustrating by example, in one or more embodiments the one or more sensors 115 can include a gravity detector. In one or more embodiments, the prioritized fingerprint reference data file is selected as a function of the direction of gravity 117. If, for example, the electronic device 100 is in a surface supported condition with the fingerprint sensor 106 situated on the rear major surface 108 with the display 105 facing upward, the fingerprint sensor 106 will be inaccessible until the electronic device 100 is transferred to a held condition. The gravity detector can be used to determine the direction of gravity 117 passing through major surfaces of the electronic device 100 to determine whether the display 105 is facing upward when the electronic device is in a surface supported condition or wither the rear major surface 108 is facing upward. For example, one or more accelerometers and/or gyroscopes may be used to show vertical orientation, constant, or a measurement of tilt relative to a direction of gravity 117. Accordingly, in one or more embodiments, the one or more processors 110 can use the gravity detector to determine an orientation of the electronic device 100 in three-dimensional space 121 relative to the direction of gravity 117.

This information can be used to detect the mechanical support condition of the electronic device. For example, when the electronic device 100 is lying on a horizontal surface such as a table, the direction of gravity 117 will pass orthogonally through a major surface of the device housing 102. When a user is holding the electronic device 100, it is rarely the case that the direction of gravity 117 will orient in this fashion, as the user rarely holds the electronic device 100 in a fully horizontal condition. Accordingly, the direction of gravity 117 can be used to determine the mechanical support condition of the electronic device 100.

In another embodiment the one or more sensors 115 comprise proximity sensors. The proximity sensors can be used to detect the mechanical support condition of the electronic device 100. Illustrating by example, coverage locations of the proximity sensors can also be used to determine whether the electronic device 100 is being held or sitting on a table, which allows the one or more processors 110 to determine the mechanical support condition of the electronic device 100.

The proximity sensors can include one or more proximity sensor components. The proximity sensors can also include one or more proximity detector components. In one embodiment, the proximity sensor components comprise only signal receivers. By contrast, the proximity detector components include a signal receiver and a corresponding signal transmitter.

In one embodiment, the proximity sensor components comprise an infrared signal receiver so as to be able to detect infrared emissions from a person. Accordingly, the proximity sensor components require no transmitter since objects disposed external to the electronic device 100 deliver emissions that are received by the infrared receiver. As no transmitter is required, each proximity sensor component can operate at a very low power level.

In one embodiment, one or more proximity detector components can each include a signal receiver and a corresponding signal transmitter. The signal transmitter can transmit a beam of infrared light that reflects from a nearby object and is received by a corresponding signal receiver. The proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

In one or more embodiments, the one or more sensors 115 can comprise an image capture analysis/synthesis manager. When one or both of the front facing image capture device 103 and/or the rear facing image capture device 104 capture an image of a hand grasping the electronic device 100, the image capture analysis/synthesis manager can detect that the mechanical support condition of the electronic device 100 is that of being held. Such images can be used to determine the handedness of the authorized user of the electronic device 100 as well. When images of a table or other flat surface are captured, or when imagers are covered with a direction of gravity passing orthogonally through major faces of the device housing 102, the image capture analysis/synthesis manager can detect that the mechanical support condition of the electronic device 100 is that of being situated on a table or other flat surface, and so forth.

In one or more embodiments, each of the front facing image capture device 103 and the rear facing image capture device 104 comprises an intelligent imager. Where configured as an intelligent imager, each image capture device 103,104 can capture one or more images of environments about the electronic device 100 and determine whether the object matches predetermined criteria. This information can be used to determine the mechanical support condition of the electronic device 100. For example, the intelligent imager can operate as an identification module configured with optical recognition such as include image recognition, character recognition, visual recognition, facial recognition, color recognition, shape recognition and the like. This information can be used to determine whether the electronic device 100 is being held or is resting on a surface. It can also be used to determine the handedness of the user as well.

In yet another embodiment, the intelligent imager can determine where a user's eyes or face are located in three-dimensional space relative to the electronic device 100. This information can be combined with the direction of gravity 117 as previously described, can be used to determine whether the electronic device 100 is being held or is sitting on a surface. When the mechanical support condition of the electronic device 100 is that of resting on a surface, the gaze of the user will generally be at a non-orthogonal angle relative to the display 105. By contrast, when the electronic device 100 is being held, the gaze of the user will generally be substantially orthogonal with the display 105, or within a range of orthogonal, such as between 75 and 105 degrees relative to the surface of the display at which the user's gaze is directed.

The one or more sensors 115 can include a skin sensor configured to determine when the electronic device 100 is touching the skin of a person. This information can be used to determine the mechanical support condition of the electronic device 100. Where the skin is touching the electronic device 100 can be used to determine the handedness of the user as well. For example, in one or more embodiments the skin sensor can determine when the electronic device 100 is being held within the hand of a user. In one embodiment, the skin sensor can include a substrate with an electrode disposed thereon. The electrode can confirm the object touching the skin sensor is skin by detecting electrical signals generated by a heartbeat in one embodiment. Other forms of skin sensors will be obvious to those of ordinary skill in the art having the benefit of this disclosure.

The one or more sensors 115 can include a light sensor. The light sensor can be used to detect whether or not direct light is incident on the device housing 102 in one or more embodiments. The light sensor can also be used to detect an intensity of ambient light is above or below a predefined threshold in one or more embodiments.

In one or more embodiments the light sensor can detect changes in optical intensity, color, light, or shadow in the near vicinity of the electronic device 100. This can be used to make inferences about whether the electronic device 100 is being held or is sitting on a surface. In one embodiment, the light sensor can be configured as an image-sensing device that captures successive images about the device and compares luminous intensity, color, or other spatial variations between images to detect weather conditions.

The one or more sensors 115 can include a temperature sensor configured to monitor the temperature of the environment. Temperature gradients along the surfaces of the electronic device 100 can be used to detect not only the mechanical support condition of the electronic device, but the handedness of the user as well. The temperature sensor can take various forms. In one embodiment, the temperature sensor is simply a proximity sensor component. In another embodiment, the temperature sensor comprises a simple thermopile. In another embodiment, the temperature sensor comprises an infrared imager that captures the amount of thermal energy emitted by an object. Other types of temperature sensors will be obvious to those of ordinary skill in the art having the benefit of this disclosure.

The one or more sensors 115 can include a force sensor. The force sensor can be used to determine that the mechanical support condition of the electronic device 100 is that of being held by a user. It can also be used to determine where the electronic device 100 is being grasped for the purposes of determining the handedness of the user. The force sensor can take various forms. For example, in one embodiment, the force sensor comprises resistive switches or a force switch array configured to detect contact with the display 105 or the device housing 102 of the electronic device 100. In another embodiment, the force sensor can include a capacitive sensor. In yet another embodiment, piezoelectric sensors can be configured to sense force as well. Other types of force sensors will be obvious to those of ordinary skill in the art having the benefit of this disclosure.

The one or more sensors 115 can include one or more motion sensors. The one or more motion sensors can include one or more accelerometers or gyroscopes. For example, an accelerometer may be embedded in the electronic circuitry of the electronic device 100 to show vertical orientation, constant tilt and/or whether the electronic device 100 is stationary. A gyroscope can be used in a similar fashion. Motion of the electronic device 100 indicates a mechanical support condition of being held, while an absence of motion may indicate the mechanical support condition of the electronic device 100 that of being stationary on a table or other surface. The one or more motion sensors can also include an electronic compass to detect the spatial orientation of the electronic device 100 relative to the earth's magnetic field.

The one or more sensors 115 can also include one or more microphones, e.g., microphone 101, operable to receive acoustic input. While the one or more microphones can be used to sense voice input, voice commands, and other audio input, in one or more embodiments they can also be used as environmental sensors to sense environmental sounds such as the electronic device 100 being placed on a table, the sound of skin moving across the device housing 102, or the rumpling of soft surfaces of textile materials or other similar materials encapsulating the electronic device 100 when the electronic device 100 is in a pocket, for example. Alternatively, the one or more microphones can be used to detect the nearby presence of items to determine the mechanical support condition of the electronic device 100.

The one or more sensors 115 can also include a moisture sensor. The moisture sensor can be configured to detect the amount of moisture on or about the display 105, or the amount of moisture present on the device housing 102. Perspiration detection can be used to determine both the mechanical support condition of the electronic device 100 and the handedness of the user as well. The moisture sensor can be realized in the form of an impedance sensor that measures impedance between electrodes. Other types of moisture sensors will be obvious to those of ordinary skill in the art having the benefit of this disclosure.

The one or more sensors 115 can include a distance measurement sensor. The distance measurement sensor can take various forms. In one or more embodiments, the distance measurement sensor comprises a time-of-flight depth imager. In another embodiment, the distance measurement sensor can comprise a radar device. In still another embodiment, the distance measurement sensor can comprise a sonar device. In yet another embodiment, the distance measurement sensor can comprise an ultrasound distance measurement device.

Regardless of type, in one or more embodiments the distance measurement sensor can perform distance determination operations. For example, the distance measurement sensor can measure distances between objects situated within the environment of the electronic device 100 in one or more embodiments. This information can be used to determine the mechanical support condition. In other embodiments, the distance measurement sensor can determine changes in distances between the electronic device 100 and objects situated within the environment. Combinations of these operations can be performed as well.

The electronic device 100 can include other components 119 as well. The other components 119 may include an earpiece speaker, a loudspeaker, key selection sensors, a touch pad sensor, a touch screen sensor, a capacitive touch sensor, and one or more switches. Touch sensors may be used to indicate whether any of the user actuation targets present on the display 105 are being actuated. Alternatively, touch sensors can determine if the fingerprint sensor 106 is being touched to determine whether fingerprint data is being delivered to the fingerprint sensor 106. The touch sensors can include surface and/or housing capacitive sensors in one embodiment.

The other components 119 operable with the one or more processors 110 can include output components such as video outputs, audio outputs, and/or mechanical outputs. Examples of output components include audio outputs, haptic devices, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Now that the various hardware components have been described, attention will be turned to methods, systems, and use cases in accordance with one or more embodiments of the disclosure. Beginning with FIG. 2, illustrated therein is one explanatory method 200 for enrolling fingerprint data as one or more fingerprint reference data files stored within a memory of an electronic device in accordance with one or more embodiments of the disclosure.

In one or more embodiments, the method 200 of FIG. 2 allows for the completion of an enrollment process receiving reference fingerprint data at a fingerprint sensor of the electronic device, where that reference fingerprint data corresponds to at least two fingers of the authorized user most likely to be used in conditions of the electronic device that are most likely to occur during usage. The method 200 of FIG. 2 stores the reference fingerprint data as two or more fingerprint reference data file in the memory of the electronic device.

The method 200 of FIG. 2 is the "learning" process that allows embodiments of the disclosure provide faster and more efficient methods for authenticating an authorized user of an electronic device using a fingerprint sensor based upon a mechanical support condition of the electronic device when fingerprint data is received. Additionally, the method 200 of FIG. 2 ensures that prioritized or preferred fingerprint data is enrolled and stored as fingerprint reference data files in a memory of the electronic device during the initial enrollment process. The method 200 enrolls fingerprint data corresponding to at least two fingers of an authorized user of the electronic device by storing, with one or more processors, the fingerprint data as at least two fingerprint reference data files in the memory of the electronic device.

At step 201, the method 200 for enrolling fingerprint data as one or more fingerprint reference data files includes determining that an authorized user of the electronic device is initiating a fingerprint sensor enrollment sequence. In one or more embodiments, the authorized user may first be required to identify himself or herself as the authorized user by entering an authentication credential at step 201. The one or more processors may prompt for the authorized user to enter a passcode at step 201 for example. Other techniques allowing for the authorized user to initially identify himself or herself as the authorized user of the electronic device will be obvious to those of ordinary skill in the art having the benefit of this disclosure.

At step 202, one or more processors of the electronic device determine a device category of the electronic device. In one embodiment, the device category is that the electronic device is a clamshell device. In another embodiment, the device category is that the electronic device is a candy bar device. Other device categories, including pivoting devices, sliding devices, bending devices, and rotating devices will be obvious to those of ordinary skill in the art having the benefit of this disclosure.

In one or more embodiments, step 203 includes one or more processors of the electronic device then determine a device configuration of the electronic device, which may include determining whether the electronic device has a single display or multiple displays. In one or more embodiments, determining the device configuration at step 203 also includes determining a location of the fingerprint sensor. Accordingly, in one or more embodiments step 203 can determine whether the fingerprint sensor is situated on a minor surface of the electronic device, on a front major surface of the electronic device, or on a rear major surface of the electronic device. Step 203 can also include detecting other hardware configurations of the electronic device, such as whether the fingerprint sensor is a standalone device or is a constituent of another component, such as a button or user interface device. Such a button with an integrated fingerprint sensor can be situated on the electronic device in various locations, e.g., on the rear surface of the electronic device, on a minor surface of the electronic device, or elsewhere.

At step 204, one or more processors of the electronic device identify at least two fingerprint reference data file types as a function of the information identified at step 202 and step 203. In one or more embodiments, step 204 comprises the one or more processors of the electronic device initially identifying the at least two fingerprint reference data file types as a function of the device category determined at step 202 and the location of the fingerprint sensor determined at step 203. As will be described below, other information can be determined, such as the handedness of the user, which can allow the one or more processors to identify the at least two fingerprint reference data file types as a function of the device category, the fingerprint sensor location, and the handedness of the authorized user of the electronic device as well. Other factors for selecting the at least two fingerprint reference data file types will be obvious to those of ordinary skill in the art having the benefit of this disclosure.

At step 205, one or more processors of the electronic device detect enrollment of fingerprint data as a fingerprint reference data file when fingerprint data is received by the fingerprint sensor. In one or more embodiments, the authorized user of the electronic device completes the enrollment process shown in FIG. 2 by delivering fingerprint data to the fingerprint sensor so that the fingerprint data can be captured and stored as one or more fingerprint reference data files in the memory of the electronic device. As explained below, in one or more embodiments the authorized user enrolls fingerprint data corresponding to at least two fingers when step 206 is repeated in response to the output of decision 207.

Illustrating by example, the authorized user may first enroll a forefinger due to the fact that the forefinger is well positioned to deliver fingerprint data to the fingerprint sensor when the electronic device has a fingerprint sensor situated on a rear major surface of the electronic device as shown in FIG. 1 above and the electronic device is being held by the user. The authorized user may then enroll fingerprint data from a second finger, such as a thumb, because the thumb can conveniently be used when the electronic device has the display facing down when the authorized user is holding the electronic device with their fingers supporting display with their thumb placed atop the rear major surface of the device housing. Additional fingers can be enrolled at step 206 as well.

In one or more embodiments, the one or more processors can prompt the user for a specific sequence of finger taps, rolls, and movements along the fingerprint sensor at step 205 to ensure the proper fingerprint data of sufficient quality is received. Accordingly, in one or more embodiments, step 205 can include the one or more processors navigating the authorized user through the enrollment process. The one or more processors may present a series of prompts informing the authorized user how to enroll the fingerprint data at step 205. This may include the one or more processors presenting a message instructing the authorized user to touch the fingerprint sensor. When fingerprint data is successfully received, in one or more embodiments the one or more processors present a verification notification at step 205.

At step 205, the one or more processors may also request that the authorized user place their finger atop the fingerprint sensor multiple times so that a sufficient amount of fingerprint data is captured to be used as a fingerprint reference data file. Accordingly, the one or more processors may present a prompt instructing the authorized user to lift their finger and then again touch the fingerprint sensor multiple times at step 205. The one or more processors may request that the authorized user move their finger slightly at step 205.

Step 205 can also include identifying which finger is being enrolled and the handedness of a user as well. Illustrating by example, in one or more embodiments step 205 can include capturing one or more images with an image capture device of the electronic device to determine which finger is being used to deliver the fingerprint data. The one or more images can also be used to determine whether the authorized user is using a right hand or a left hand to perform the fingerprint enrollment process.

From this information, the one or more processors of the electronic device ascertain the handedness of the person in one or more embodiments at step 205. It would be unlikely, for example, that an authorized user of an electronic device would initially use a left hand for fingerprint enrollment when they are righthanded, and vice versa. Accordingly, in one or more embodiments the one or more processors can use information from an imager or other sensor at step 205 to determine a handedness of the user. The imager or other sensors can also be used to determine which finger the user is attempting to enroll as well. The fingerprint data is stored as a fingerprint reference data file in the memory of the electronic device at step 206.

Decision 207 then determines whether additional fingers need to be enrolled. Since the step 204 initially identified at least two fingerprint reference data file types as a function of the device category and the fingerprint sensor location, and as only one finger has been enrolled to this point, the method 200 moves to step 208 where the one or more processors of the electronic device prompt for at least one other finger to be enrolled. Thus, to ensure that both of the at least two fingerprint reference data file types are enrolled, step 208 comprises the one or more processors prompting, at a user interface of the electronic device, for enrollment of at least one other fingerprint reference data file type of the at least to fingerprint reference data file types before terminating the enrolling process.

The method 200 then returns to step 204. In one or more embodiments, after determining the device category of the electronic device (step 202), a fingerprint sensor location of the fingerprint sensor (step 203), and a handedness of the authorized user (step 205), the one or more processors identify at least two fingerprint reference data file types at step 204 as a function of these factors. For example, the one or more processors may identify a right thumb and index finger as at least two fingerprint reference data file types as a function of the device category, the fingerprint sensor location, and the handedness of the authorized user.

The one or more processors then detect enrollment of a second fingerprint reference data file type of the at least two fingerprint reference data file types at step 205, with this second fingerprint reference data file type being stored as a fingerprint reference data file at step 206. Once all requisite fingerprint reference data file types are enrolled, the method 200 ends at step 209. Once the enrollment process is complete, another verification notification may be presented informing the authorized user of the same at step 209. While the method 200 of FIG. 2 provides one illustrative technique for enrolling fingerprint reference data file types, other techniques for performing an enrollment process will be obvious to those of ordinary skill in the art having the benefit of this disclosure.

Figure 3:
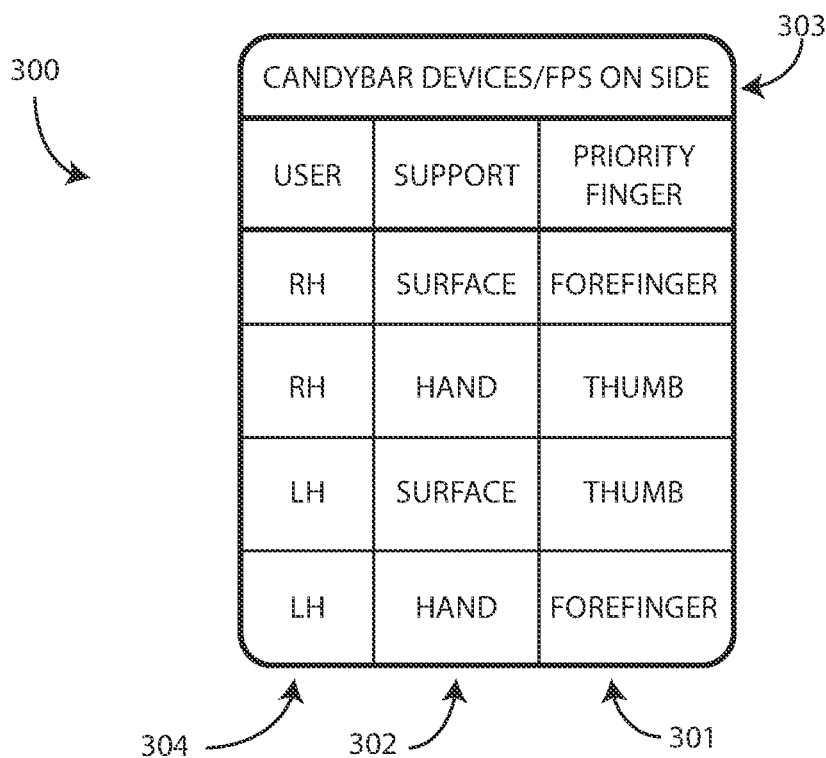
FIGS. 3-5 illustrate one or more preselected fingerprint reference data files selected as a function of a mechanical support condition of an electronic device in accordance with one or more embodiments of the disclosure.
Figure 4:
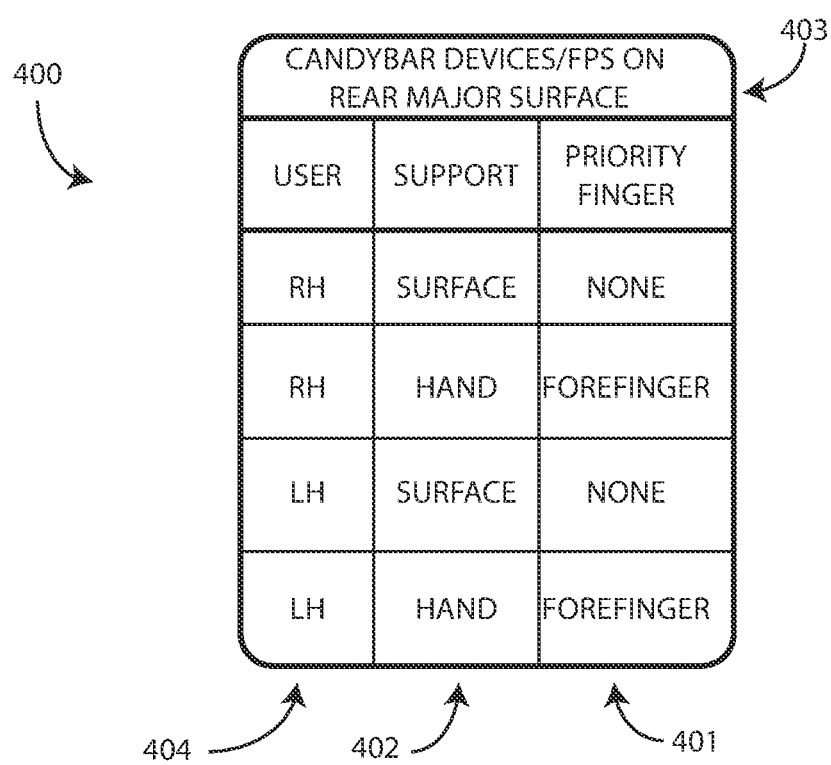
Figure 5:
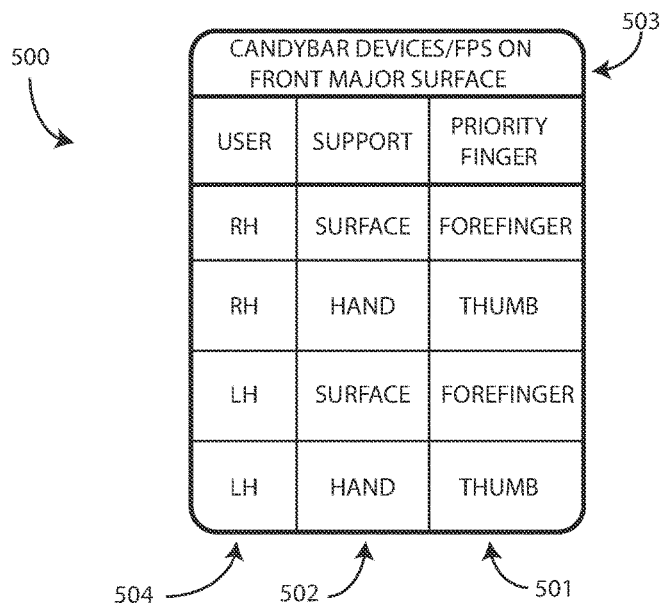

Thereafter, the fingerprint reference data files can be prioritized to make unlocking the electronic device faster, more seamless, and more efficient. In one or more embodiments, the fingerprint reference data files are prioritized as a function of the fingerprint sensor location, the handedness of the user, and/or the mechanical support condition of the electronic device. Turning now to FIGS. 3-5, illustrated therein is tables 300,400,500 of prioritized fingerprint reference data file types 301,401,501 as a function of fingerprint sensor location 303,403,503, handedness of the user 304,404,504, and mechanical support condition 302,402, 502 in accordance with one or more embodiments of the disclosure.

Beginning with FIG. 3, when the fingerprint sensor location 303 is on a minor surface of the electronic device, and the mechanical support condition 302 comprises the electronic device being supported by a surface such as a table, and the handedness of a user 304 is right-handed, in one or more embodiments the prioritized fingerprint reference data file type 301 is a forefinger fingerprint reference data file type. When the fingerprint sensor location 303 is on a minor surface of the electronic device, and the mechanical support condition 302 comprises the electronic device being supported by a surface such as a table, and the handedness of a user 304 is left-handed, in one or more embodiments the prioritized fingerprint reference data file type 301 is a thumb fingerprint reference data file type.

In one or more embodiments, when the fingerprint sensor location 303 is on a minor surface of the electronic device, and the mechanical support condition 302 comprises the electronic device being held in a hand, and the handedness of a user 304 is right-handed, in one or more embodiments the prioritized fingerprint reference data file type 301 is a thumb fingerprint reference data file type. When the fingerprint sensor location 303 is on a minor surface of the electronic device, and the mechanical support condition 302 comprises the electronic device being a held condition in the hand of a user, and the handedness of a user 304 is left-handed, in one or more embodiments the prioritized fingerprint reference data file type 301 is a forefinger fingerprint reference data file type.

Turning now to FIG. 4, illustrated therein is a table 400 depicting prioritized fingerprint reference data files for an electronic device having a fingerprint sensor location on a rear major surface of the electronic device. The surface supported mechanical support conditions 402 presume that the fingerprint sensor is facing upward.

In one or more embodiments, when the fingerprint sensor location 403 is on a rear major surface of the electronic device, and the mechanical support condition 402 comprises the electronic device being supported by a surface such as a table, and the handedness of a user 404 is right-handed or left-handed, there is no prioritized fingerprint reference data file type 401. This is the case because an authorized user of the electronic device is equally likely to use a thumb or forefinger to unlock the electronic device.

When the fingerprint sensor location 403 is on a rear major surface of the electronic device, and the mechanical support condition 402 comprises the electronic device being a held condition with the electronic device in the hand of a user, and the handedness of a user 404 is right-handed or left-handed, in one or more embodiments the prioritized fingerprint reference data file type 401 is a forefinger fingerprint reference data file type.

Turning now to FIG. 5, illustrated therein is a table 500 depicting prioritized fingerprint reference data files for an electronic device having a fingerprint sensor location on a front major surface of the electronic device. As noted above, when situated on the front major surface, the fingerprint sensor could be situated beneath the display or adjacent to the display. Other configurations and placements for the fingerprint sensor and display along the front major surface will be obvious to those of ordinary skill in the art having the benefit of this disclosure.

In one or more embodiments, when the fingerprint sensor location 503 is on a front major surface of the electronic device, and the mechanical support condition 502 comprises the electronic device being supported by a surface such as a table, and the handedness of a user 504 is right-handed or left-handed, the prioritized fingerprint reference data file type 501 is a forefinger fingerprint reference data file type. When the fingerprint sensor location 503 is on a front major surface of the electronic device, and the mechanical support condition 502 comprises the electronic device being a held condition with the electronic device in the hand of a user, and the handedness of a user 504 is right-handed or left-handed, in one or more embodiments the prioritized fingerprint reference data file type 401 is a thumb fingerprint reference data file type.

Accordingly, in accordance with the tables 300,400,500 of FIGS. 3-5, when the fingerprint sensor receives the fingerprint data while the electronic device is in the detected mechanical support condition and the handedness of the user is known, the one or more processors select one fingerprint reference data file from the at least two fingerprint reference data files as a function of these conditions. Thereafter, the one or more processors authenticate the authorized user of the electronic device by comparing the received fingerprint data to the selected fingerprint reference data file before comparing the fingerprint data to any other fingerprint reference data file stored in the memory.

Figure 6:
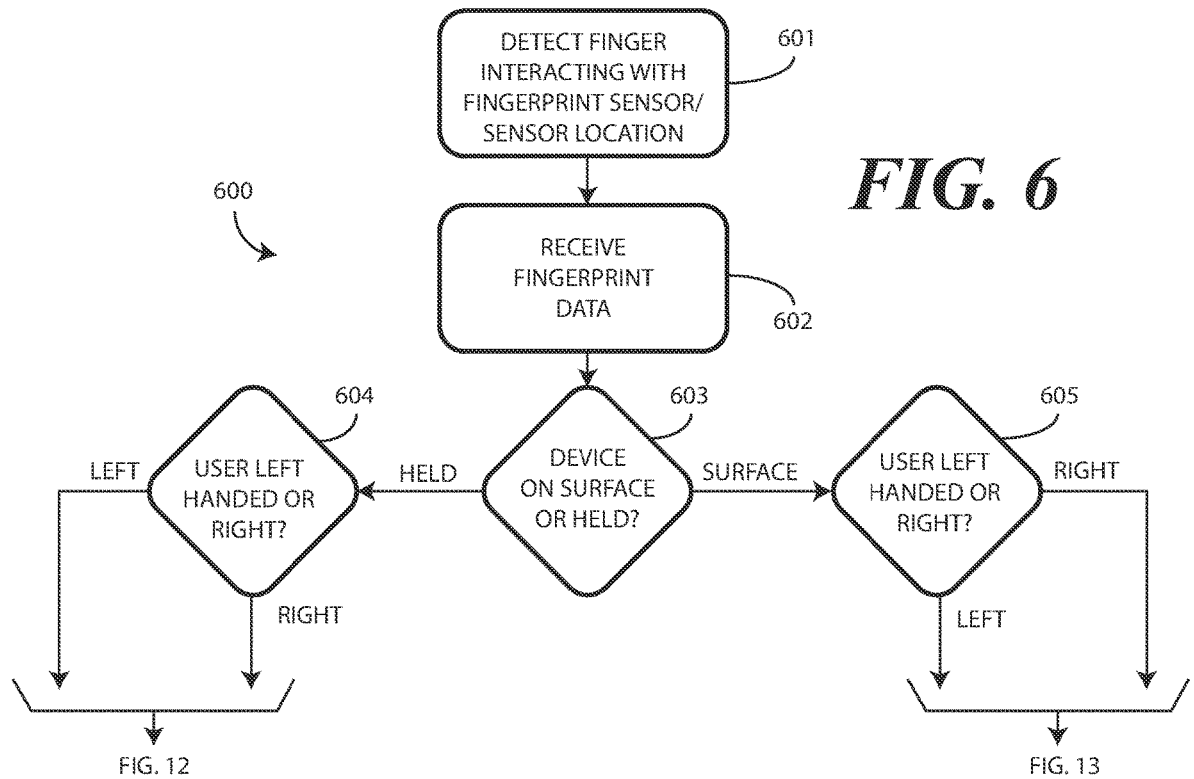
FIG. 6 illustrates one explanatory method in accordance with one or more embodiments of the disclosure.

Thus, the one or more processors can advantageously anticipate that the authorized user will used, for instance, an index finger to authenticate themselves based upon the fingerprint location, the handedness of the user, and the mechanical support condition and can compare the fingerprint data to the index finger fingerprint reference data file (for example) before comparing the fingerprint data to the thumb fingerprint reference data file in one or more embodiments. This streamlines the authentication process, which makes unlocking the electronic device faster and more efficient. When combined with the enrollment process that ensures that all likely fingers that will be used in the most likely mechanical support conditions and fingerprint sensor location are enrolled, embodiments of the disclosure allow a user to more quickly unlock an electronic device. Embodiments of the disclosure also save power and processor cycles as well. Turning now to FIG. 6, illustrated therein is one explanatory method 600 by which this can occur.

The method 600 of FIG. 6 prioritizes a particular finger when authenticating an authorized user of the electronic device as a function of the mechanical support condition of the electronic device. The method 600 can additionally prioritize a particular finger as a function of additional factors, including the location of the fingerprint sensor, the handedness of the user or other factors. While multiple fingers can be used for authentication regardless of the mechanical support condition of the electronic device, the fingerprint sensor location, or the handedness of the user, prioritizing a particular finger as a function of these conditions advantageously saves processor cycles in the authentication process to provide a more instantaneous authentication operation.

Beginning at step 601, one or more processors of an electronic device identify a fingerprint sensor location. This can be done once, or when the one or more processors detect fingerprint data being received by the fingerprint sensor.

In one or more embodiments, one or more processors also detect, at step 601 using one or more sensors, a mechanical support condition of the electronic device. In one or more embodiments, step 601 comprises determining whether the mechanical support condition comprises a hand supported condition occurring when the electronic device is being held by a user, or when the mechanical support condition is a surface supported condition such as when the electronic device is resting on a surface such as a counter, table, upon a surface in a car, or on a piece of furniture. Other mechanical support conditions can be determined as well, such as when the electronic device is in a stowed state, which is a condition the electronic device may experience when situated in a purse, pocket, or drawer.

This mechanical support condition can be determined at step 601 in a variety of ways, including those described above with reference to FIG. 1. Illustrating by example, if one or more motion sensors detect an absence of motion while a gravity detector detects the direction of gravity passing substantially orthogonally through major surfaces of the electronic device, the one or more processors may conclude that the electronic device is resting upon a horizontal surface. By contrast, if the one or more motion sensors detect that the electronic device is moving while a touch sensor detects touch along the housing of the electronic device, the one or more processors may conclude that the electronic device is being held, and so forth.

In one or more embodiments, step 601 also comprises determining a handedness of the user. This can be determined during the enrollment process described above with reference to FIG. 2. This can also be done when the fingerprint sensor receives fingerprint data. Illustrating by example, an image capture device can capture images about the location of the fingerprint sensor to determine which hand a user is employing to deliver fingerprint data to the fingerprint sensor. Other techniques will be obvious to those of ordinary skill in the art having the benefit of this disclosure.

At step 602, a fingerprint sensor of the electronic device receives fingerprint data. In one or more embodiments, the fingerprint data received at step 602 is received while the electronic device is in the mechanical support condition determined at step 601.

Decision 603 determines whether the mechanical support condition of the electronic device is a surface supported condition or a hand supported condition. In other embodiments, decision 603 can include other possible conditions, including stowed conditions, in-pocket conditions, and so forth. However, for brevity, the two mechanical support conditions of a surface supported condition and a hand supported condition are used for illustration purposes. It will be obvious to those of ordinary skill in the art having the benefit of this disclosure how the method 600 of FIG. 6 could be extended to additional conditions based upon this explanatory illustration.

Decision 604 then determines whether the handedness of the user is right-handed or left-handed. Decision 604 makes this determination for situations where the mechanical support condition is a held condition. Decision 605 effectively makes the same decision, but for instances where the mechanical support condition is a surface supported condition.

Additional method steps following decision 604 for situations where the fingerprint sensor is situated on a minor surface of the electronic device are described in FIG. 7 below. Additional method steps following decision 604 for situations where the fingerprint sensor is situated on a rear major surface of the electronic device are described in FIG. 9 below. Additional method steps following decision 604 for situations where the fingerprint sensor is situated on a front major surface of the electronic device are described in FIG. 11 below.

Additional method steps following decision 605 for situations where the fingerprint sensor is situated on a minor surface of the electronic device are described in FIG. 8 below. Additional method steps following decision 605 for situations where the fingerprint sensor is situated on a rear major surface of the electronic device are described in FIG. 10 below. Additional method steps following decision 605 for situations where the fingerprint sensor is situated on a front major surface of the electronic device are described in FIG. 12 below.

Figure 7:
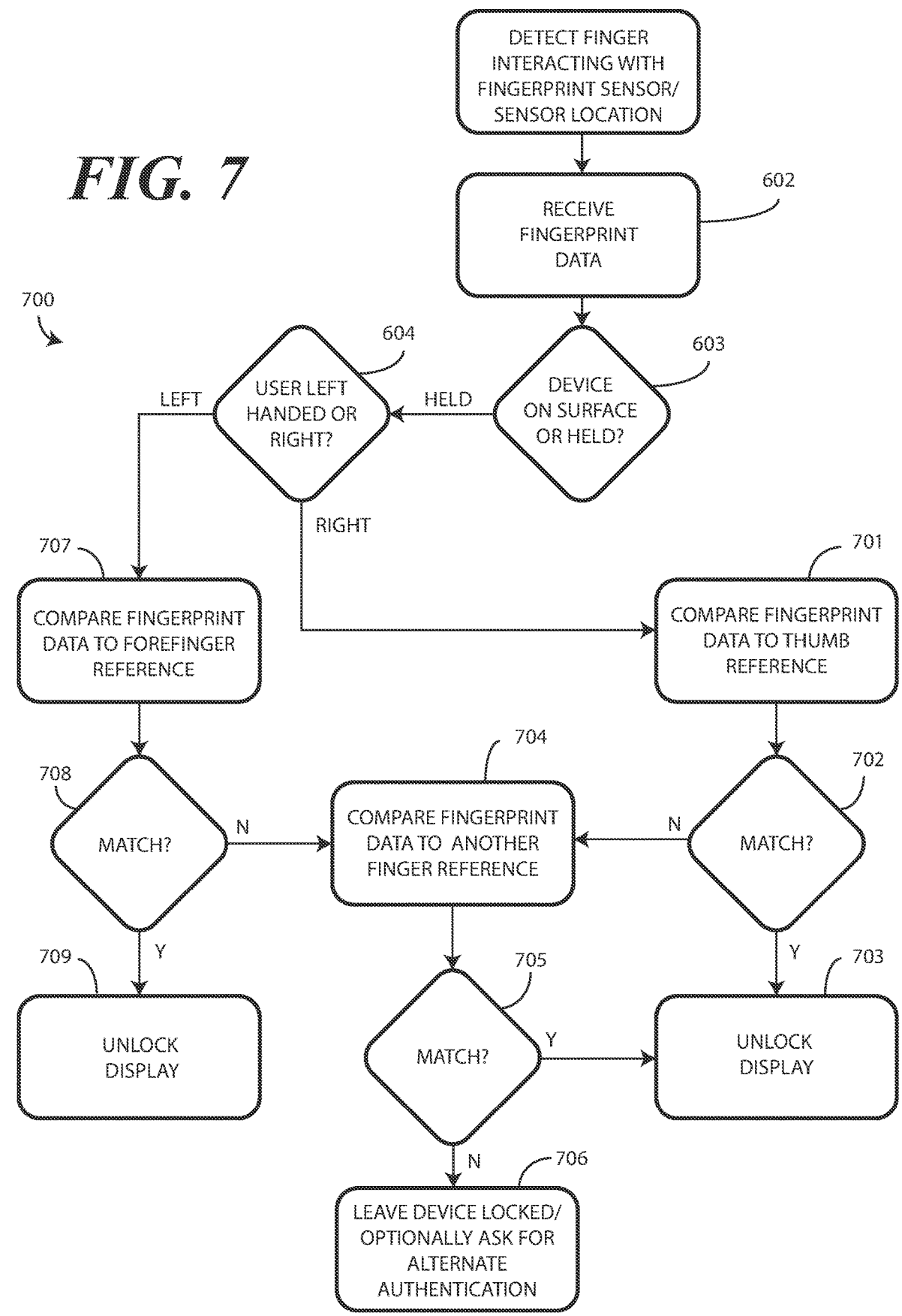
FIG. 7 illustrates another explanatory method in accordance with one or more embodiments of the disclosure.
Figure 8:
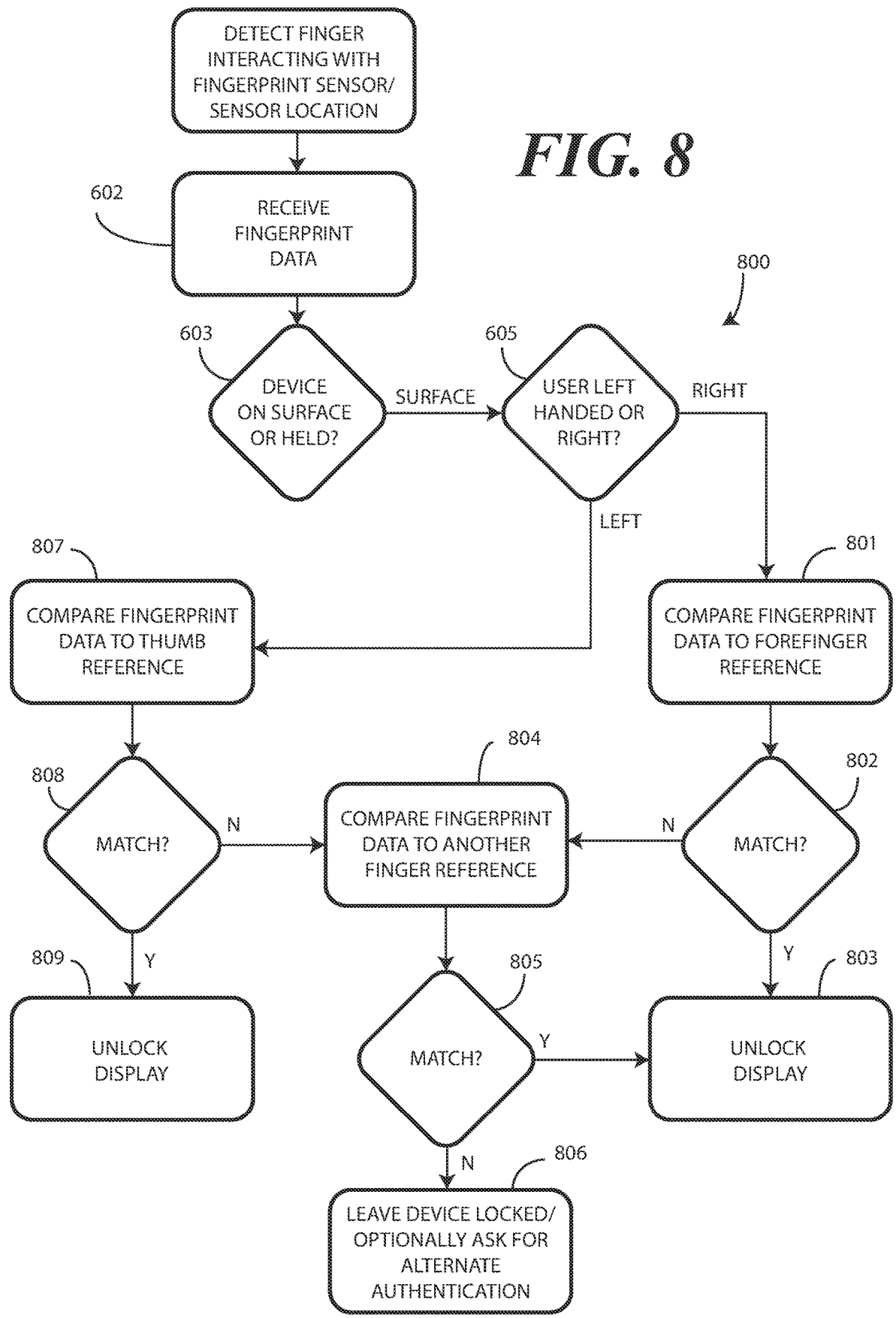
FIG. 8 illustrates yet another explanatory method in accordance with one or more embodiments of the disclosure.

Turning now to FIGS. 7-8, these figures illustrate how one or more processors can select a preselected fingerprint reference data file to which the fingerprint data will be compared before comparing the fingerprint data to any other fingerprint reference data file stored in a memory of the electronic device when the fingerprint sensor is situated on a minor surface of the electronic device. In one or more embodiments, this preselected fingerprint reference data file is selected as a function of the mechanical support condition, the fingerprint sensor location, and the handedness of the user.

Beginning with FIG. 7, when decision 603 determines that the mechanical support condition is a hand supported condition with the fingerprint sensor location situated on a minor surface of the electronic device, and decision 604 determines that the handedness of the user is right-handed, the method 700 moves to step 701. At step 701, the one or more processors of the electronic device select a preselected fingerprint reference data file as a function of this mechanical support condition, fingerprint sensor location, and user handedness. In one or more embodiments, the preselected fingerprint reference data file comprises a thumb fingerprint reference data file.

Since the authorized user enrolled at least two fingers using the method (200) of FIG. 2, the memory of the electronic device stores a plurality of fingerprint reference data files. Illustrating by example, if the authorized user enrolls the thumb and forefinger in the method of FIG. 2, the memory will store a forefinger fingerprint reference data file and a thumb fingerprint reference data file. If the authorized user enrolls additional fingers, the memory will store additional fingerprint reference data files, and so forth. The selection occurring at step 701 makes a selection of one fingerprint reference data file from this plurality of fingerprint reference data files as a function of the mechanical support condition, the fingerprint sensor location, and the handedness of the user in one or more embodiments.

At step 701, the one or more processors then compare the fingerprint data received at step 602 with the thumb fingerprint reference data file before comparing the fingerprint data to any other fingerprint reference data file stored in the memory of the electronic device. In one or more embodiments, step 701 comprises the one or more processors prioritizing the thumb fingerprint data by comparing the fingerprint data received at step 602 with the thumb fingerprint data reference file stored in the memory of the electronic device before comparing the fingerprint data to any other fingerprint reference data files stored in the memory whenever the electronic device is a candy bar device, the fingerprint sensor is situated on the side, i.e., a minor surface, of the device housing, the device is being held, and the authorized user is a right handed user.

If the fingerprint data substantially matches the thumb fingerprint reference data file, as determined at decision 702, the one or more processors authenticate the user delivering the fingerprint data at step 602 as the authorized user of the electronic device and unlock the electronic device in response to authenticating the authorized user of the electronic device at step 703. Otherwise, the method 700 moves to step 704 where additional fingerprint reference data files are compared to the fingerprint data until a match is determined at decision 705. If no match is ever made, the electronic device and its displays remain locked at step 706. The one or more processors can optionally prompt for an alternate authentication credential at step 706, such as a password, personal identification number, or other credential, in one or more embodiments.

In contrast to this prioritization of the thumb occurring when the electronic device being held with the fingerprint sensor situated on a side of the electronic device and with the user being right handed, when the user is left handed the one or more processors then compare the fingerprint data received at step 602 with the forefinger fingerprint reference data file at step 707 before comparing the fingerprint data to any other fingerprint reference data file stored in the memory of the electronic device. Accordingly, in one or more embodiments step 707 comprises the one or more processors prioritizing the forefinger fingerprint data by comparing the fingerprint data received at step 602 with the forefinger fingerprint data reference file stored in the memory of the electronic device before comparing the fingerprint data to any other fingerprint reference data files stored in the memory whenever the electronic device is a candy bar device, the fingerprint sensor is situated on the side, i.e., a minor surface, of the device housing, the device is being held, and the authorized user is a left handed user.

If the fingerprint data substantially matches the forefinger fingerprint reference data file, as determined at decision 708, the one or more processors authenticate the user delivering the fingerprint data at step 602 as the authorized user of the electronic device and unlock the electronic device in response to authenticating the authorized user of the electronic device at step 709. Otherwise, the method 600 moves to step 704 where additional fingerprint reference data files are compared to the fingerprint data until a match is determined at decision 705. If no match is ever made, the electronic device and its displays remain locked at step 706. The one or more processors can optionally prompt for an alternate authentication credential at step 706, such as a password, personal identification number, or other credential, in one or more embodiments.

Turning now to FIG. 8, when decision 603 determines that the mechanical support condition is a surface supported condition with the fingerprint sensor location situated on a minor surface of the electronic device, and decision 605 determines that the handedness of the user is right-handed, the method 800 moves to step 801. At step 801, the one or more processors of the electronic device select a preselected fingerprint reference data file as a function of this mechanical support condition, fingerprint sensor location, and user handedness. In one or more embodiments, the preselected fingerprint reference data file comprises a forefinger fingerprint reference data file.

At step 801, the one or more processors then compare the fingerprint data received at step 602 with the forefinger fingerprint reference data file before comparing the fingerprint data to any other fingerprint reference data file stored in the memory of the electronic device. In one or more embodiments, step 801 comprises the one or more processors prioritizing the forefinger fingerprint data by comparing the fingerprint data received at step 602 with the forefinger fingerprint data reference file stored in the memory of the electronic device before comparing the fingerprint data to any other fingerprint reference data files stored in the memory whenever the electronic device is a candy bar device, the fingerprint sensor is situated on the side, i.e., a minor surface, of the device housing, the device is on a surface, and the authorized user is a right handed user.

If the fingerprint data substantially matches the forefinger fingerprint reference data file, as determined at decision 802, the one or more processors authenticate the user delivering the fingerprint data at step 602 as the authorized user of the electronic device and unlock the electronic device in response to authenticating the authorized user of the electronic device at step 803. Otherwise, the method 800 moves to step 804 where additional fingerprint reference data files are compared to the fingerprint data until a match is determined at decision 805. If no match is ever made, the electronic device and its displays remain locked at step 806. The one or more processors can optionally prompt for an alternate authentication credential at step 806, as noted above.

In contrast to this prioritization of the forefinger occurring when the electronic device supported by a surface with the fingerprint sensor situated on a side of the electronic device and with the user being right handed, when the user is left handed the one or more processors then compare the fingerprint data received at step 602 with the thumb fingerprint reference data file at step 807 before comparing the fingerprint data to any other fingerprint reference data file stored in the memory of the electronic device. Accordingly, in one or more embodiments step 807 comprises the one or more processors prioritizing the thumb fingerprint data by comparing the fingerprint data received at step 602 with the thumb fingerprint data reference file stored in the memory of the electronic device before comparing the fingerprint data to any other fingerprint reference data files stored in the memory whenever the electronic device is a candy bar device, the fingerprint sensor is situated on the side, i.e., a minor surface, of the device housing, the device is supported by a surface, and the authorized user is a left handed user.

If the fingerprint data substantially matches the thumb fingerprint reference data file, as determined at decision 808, the one or more processors authenticate the user delivering the fingerprint data at step 602 as the authorized user of the electronic device and unlock the electronic device in response to authenticating the authorized user of the electronic device at step 809. Otherwise, the method 800 moves to step 804 where additional fingerprint reference data files are compared to the fingerprint data until a match is determined at decision 805. If no match is ever made, the electronic device and its displays remain locked at step 806. The one or more processors can optionally prompt for an alternate authentication credential at step 806, such as a password, personal identification number, or other credential, in one or more embodiments.

Figure 9:
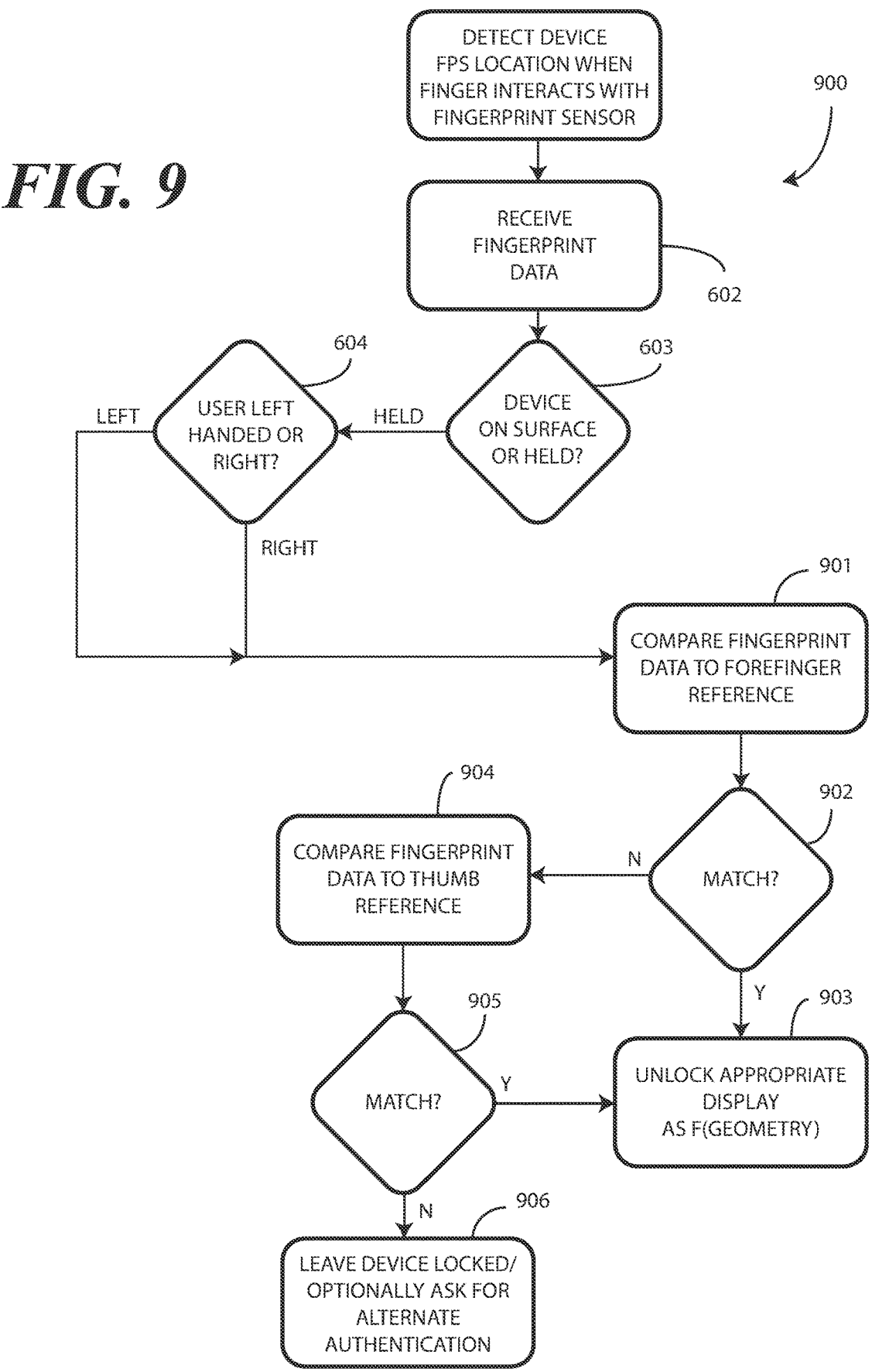
FIG. 9 illustrates still another explanatory method in accordance with one or more embodiments of the disclosure.

Turning now to FIG. 9, illustrated therein are method steps similar to those of FIG. 7, but for electronic devices where the fingerprint sensor is situated on a rear major surface. In such situations, when decision 603 determines that the mechanical support condition is a hand supported condition with the fingerprint sensor location situated on a rear major surface of the electronic device, and decision 604 determines that the handedness of the user is right-handed, the method 900 moves to step 901. At step 901, the one or more processors of the electronic device select a preselected fingerprint reference data file as a function of this mechanical support condition, fingerprint sensor location, and user handedness. In one or more embodiments, the preselected fingerprint reference data file comprises a forefinger fingerprint reference data file.

At step 901, the one or more processors then compare the fingerprint data received at step 602 with the forefinger fingerprint reference data file before comparing the fingerprint data to any other fingerprint reference data file stored in the memory of the electronic device. In one or more embodiments, step 901 comprises the one or more processors prioritizing the forefinger fingerprint data by comparing the fingerprint data received at step 602 with the forefinger fingerprint data reference file stored in the memory of the electronic device before comparing the fingerprint data to any other fingerprint reference data files stored in the memory whenever the electronic device is a candy bar device, the fingerprint sensor is situated on the rear major surface of the device housing, the device is being held, and the authorized user is a right handed user.

If the fingerprint data substantially matches the forefinger fingerprint reference data file, as determined at decision 902, the one or more processors authenticate the user delivering the fingerprint data at step 602 as the authorized user of the electronic device and unlock the electronic device in response to authenticating the authorized user of the electronic device at step 903. Otherwise, the method 900 moves to step 904 where additional fingerprint reference data files are compared to the fingerprint data until a match is determined at decision 905. If no match is ever made, the electronic device and its displays remain locked at step 906. The one or more processors can optionally prompt for an alternate authentication credential at step 906, such as a password, personal identification number, or other credential, in one or more embodiments.

The operation of the method 900 is the same when the electronic device is being held, the fingerprint sensor is situated on the rear major surface of the electronic device, and the handedness of the user is left-handed as well. At step 901, the one or more processors of the electronic device again select a preselected fingerprint reference data file as a function of this mechanical support condition, fingerprint sensor location, and user handedness. In one or more embodiments, the preselected fingerprint reference data file again comprises a forefinger fingerprint reference data file, albeit a left forefinger rather than the right forefinger that is selected when the handedness of the user is right-handed.

At step 901, the one or more processors then compare the fingerprint data received at step 602 with the forefinger fingerprint reference data file before comparing the fingerprint data to any other fingerprint reference data file stored in the memory of the electronic device. In one or more embodiments, step 901 comprises the one or more processors prioritizing the forefinger fingerprint data by comparing the fingerprint data received at step 602 with the forefinger fingerprint data reference file stored in the memory of the electronic device before comparing the fingerprint data to any other fingerprint reference data files stored in the memory whenever the electronic device is a candy bar device, the fingerprint sensor is situated on the rear major surface of the device housing in a central location, the device is being held, and the authorized user is a left handed user.

If the fingerprint data substantially matches the forefinger fingerprint reference data file, as determined at decision 902, the one or more processors authenticate the user delivering the fingerprint data at step 602 as the authorized user of the electronic device and unlock the electronic device in response to authenticating the authorized user of the electronic device at step 903. Otherwise, the method 900 moves to step 904 where additional fingerprint reference data files are compared to the fingerprint data until a match is determined at decision 905. If no match is ever made, the electronic device and its displays remain locked at step 906. The one or more processors can optionally prompt for an alternate authentication credential at step 906, such as a password, personal identification number, or other credential, in one or more embodiments.

Figure 10:
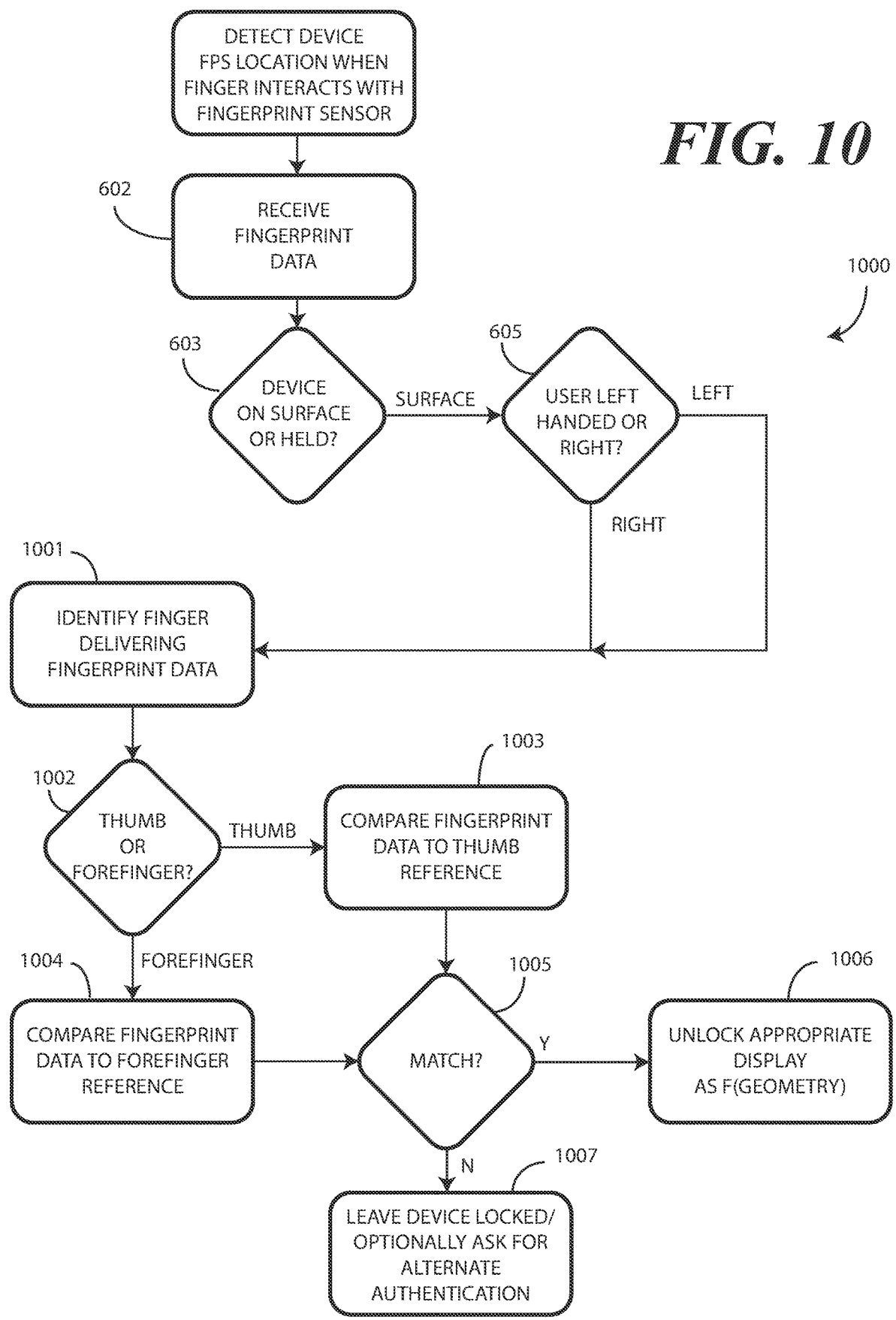
FIG. 10 illustrates another explanatory method in accordance with one or more embodiments of the disclosure.

Turning now to FIG. 10, when decision 603 determines that the mechanical support condition is a surface supported condition with the fingerprint sensor location situated on a rear major surface of the electronic device, and decision 605 determines that the handedness of the user is right-handed, the method 1000 moves to step 1001. It should be noted that the method 600 of FIG. 10 presumes that the display is face down so that the fingerprint sensor is oriented upward and is accessible. If the fingerprint sensor is situated against the surface, it is inaccessible and the method 1000 of FIG. 10 does not apply.

In one or more embodiments, when the mechanical support condition is a surface supported condition for an electronic device having a fingerprint sensor situated on a rear major surface, embodiments of the disclosure contemplate that multiple fingers can equally be used to authenticate the authorized user. While this is ultimately true as well in hand supported mechanical support condition of FIG. 9, the method 1000 of FIG. 10 uses additional processor cycles in making the authentication, thereby making it slower than the right side of the method 900 of FIG. 9.

Specifically, an additional step of identifying the type of fingerprint data occurs at step 1001. The one or more processors analyze the fingerprint data to determine which finger provided the same at decision 1002. Using a thumb and forefinger as an illustrative example, if decision 1002 determines the finger supplying the fingerprint data is a thumb, this fingerprint data is compared to a thumb fingerprint reference data file at step 1003 to determine if it substantially matches the same. By contrast, if the if decision 1002 determines the finger supplying the fingerprint data is a forefinger, this fingerprint data is compared to a forefinger fingerprint reference data file at step 1004 to determine if it substantially matches the same. If a match is made as determined at decision 1005, the exterior display is unlocked at step 1006. If no match is ever made, the electronic device and its displays remain locked at step 1007. The one or more processors can optionally prompt for an alternate authentication credential at step 1007 in one or more embodiments as previously noted.

The process is the same when the user handedness is left-handed when the electronic device is surface supported with its fingerprint sensor situated on a rear surface (again presuming the fingerprint sensor is facing upward). An additional step of identifying the type of fingerprint data occurs at step 1001. The one or more processors analyze the fingerprint data to determine which finger provided the same at decision 1002. If decision 1002 determines the finger supplying the fingerprint data is a thumb, this fingerprint data is compared to a thumb fingerprint reference data file at step 1003 to determine if it substantially matches the same. By contrast, if the if decision 1002 determines the finger supplying the fingerprint data is a forefinger, this fingerprint data is compared to a forefinger fingerprint reference data file at step 1004 to determine if it substantially matches the same. If a match is made as determined at decision 1005, the exterior display is unlocked at step 1006. If no match is ever made, the electronic device and its displays remain locked at step 1007. The one or more processors can optionally prompt for an alternate authentication credential at step 1007 in one or more embodiments as previously noted.

Figure 11:
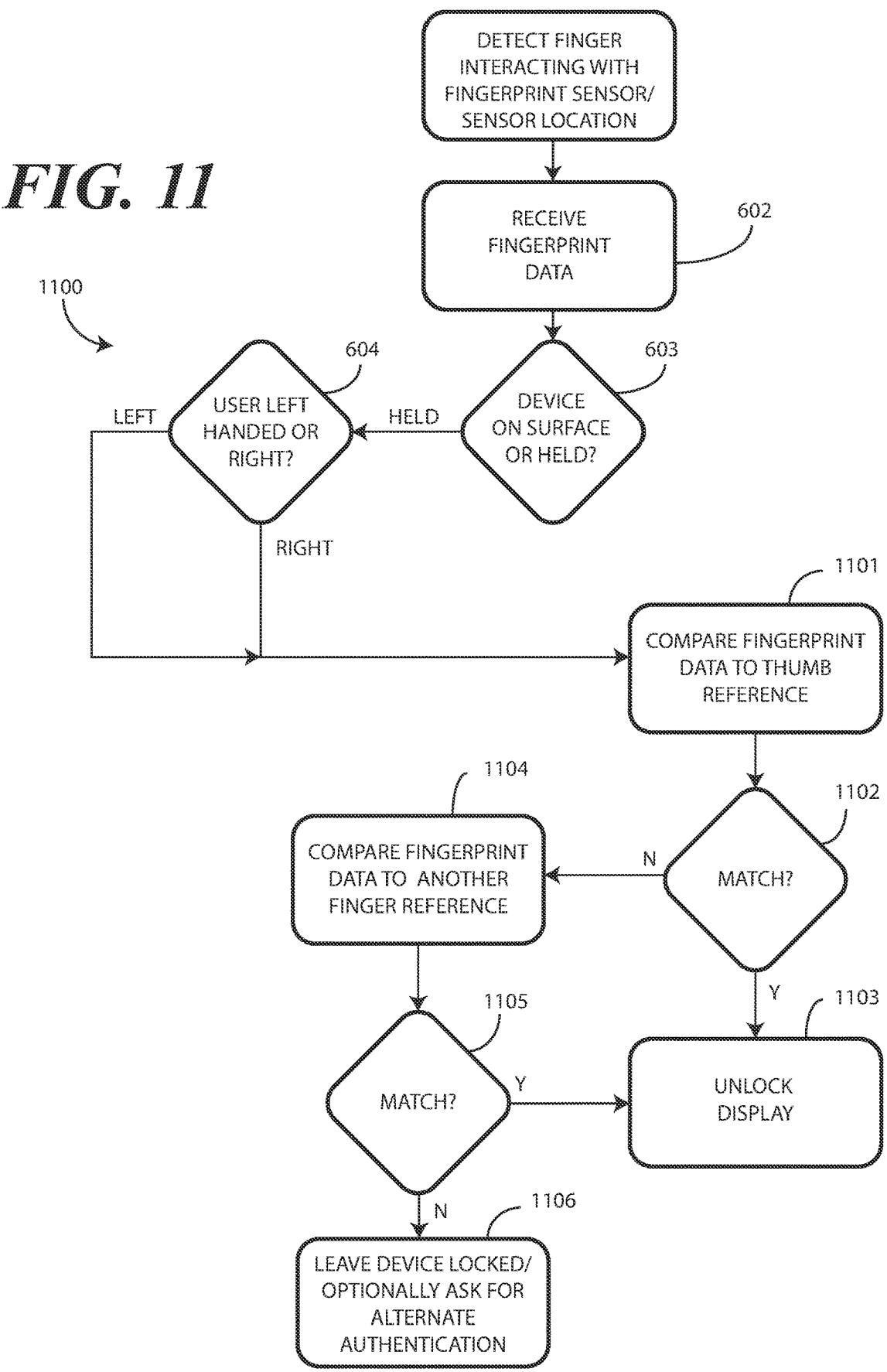
FIG. 11 illustrates another explanatory method in accordance with one or more embodiments of the disclosure.

Turning now to FIG. 11, illustrated therein are method steps similar to those of FIGS. 7 and 9, but for electronic devices where the fingerprint sensor is situated on a front major surface. In such situations, when decision 603 determines that the mechanical support condition is a hand supported condition with the fingerprint sensor location situated on a front major surface of the electronic device, and decision 604 determines that the handedness of the user is right-handed, the method 1100 moves to step 1101. At step 1101, the one or more processors of the electronic device select a preselected fingerprint reference data file as a function of this mechanical support condition, fingerprint sensor location, and user handedness. In one or more embodiments, the preselected fingerprint reference data file comprises a thumb fingerprint reference data file.

At step 1101, the one or more processors then compare the fingerprint data received at step 602 with the thumb fingerprint reference data file before comparing the fingerprint data to any other fingerprint reference data file stored in the memory of the electronic device. In one or more embodiments, step 1101 comprises the one or more processors prioritizing the thumb fingerprint data by comparing the fingerprint data received at step 602 with the thumb fingerprint data reference file stored in the memory of the electronic device before comparing the fingerprint data to any other fingerprint reference data files stored in the memory whenever the electronic device is a candy bar device, the fingerprint sensor is situated on the front major surface of the device housing, the device is being held, and the authorized user is a right handed user.

If the fingerprint data substantially matches the thumb fingerprint reference data file, as determined at decision 1102, the one or more processors authenticate the user delivering the fingerprint data at step 602 as the authorized user of the electronic device and unlock the electronic device in response to authenticating the authorized user of the electronic device at step 1103. Otherwise, the method 1100 moves to step 1104 where additional fingerprint reference data files are compared to the fingerprint data until a match is determined at decision 1105. If no match is ever made, the electronic device and its displays remain locked at step 1106. The one or more processors can optionally prompt for an alternate authentication credential at step 1106, such as a password, personal identification number, or other credential, in one or more embodiments.

The operation of the method 1100 is the same when the electronic device is being held, the fingerprint sensor is situated on the front major surface of the electronic device, and the handedness of the user is left-handed. At step 1101, the one or more processors of the electronic device again select a preselected fingerprint reference data file as a function of this mechanical support condition, fingerprint sensor location, and user handedness. In one or more embodiments, the preselected fingerprint reference data file again comprises a thumb fingerprint reference data file, albeit a left thumb rather than the right thumb that is selected when the handedness of the user is right-handed.

At step 1101, the one or more processors then compare the fingerprint data received at step 602 with the thumb fingerprint reference data file before comparing the fingerprint data to any other fingerprint reference data file stored in the memory of the electronic device. In one or more embodiments, step 1101 comprises the one or more processors prioritizing the thumb fingerprint data by comparing the fingerprint data received at step 602 with the thumb fingerprint data reference file stored in the memory of the electronic device before comparing the fingerprint data to any other fingerprint reference data files stored in the memory whenever the electronic device is a candy bar device, the fingerprint sensor is situated on the front major surface of the device housing, the device is being held, and the authorized user is a left handed user.

If the fingerprint data substantially matches the thumb fingerprint reference data file, as determined at decision 1102, the one or more processors authenticate the user delivering the fingerprint data at step 602 as the authorized user of the electronic device and unlock the electronic device in response to authenticating the authorized user of the electronic device at step 1103. Otherwise, the method 1100 moves to step 1104 where additional fingerprint reference data files are compared to the fingerprint data until a match is determined at decision 1105. If no match is ever made, the electronic device and its displays remain locked at step 1106. The one or more processors can optionally prompt for an alternate authentication credential at step 1106, such as a password, personal identification number, or other credential, in one or more embodiments.

Figure 12:
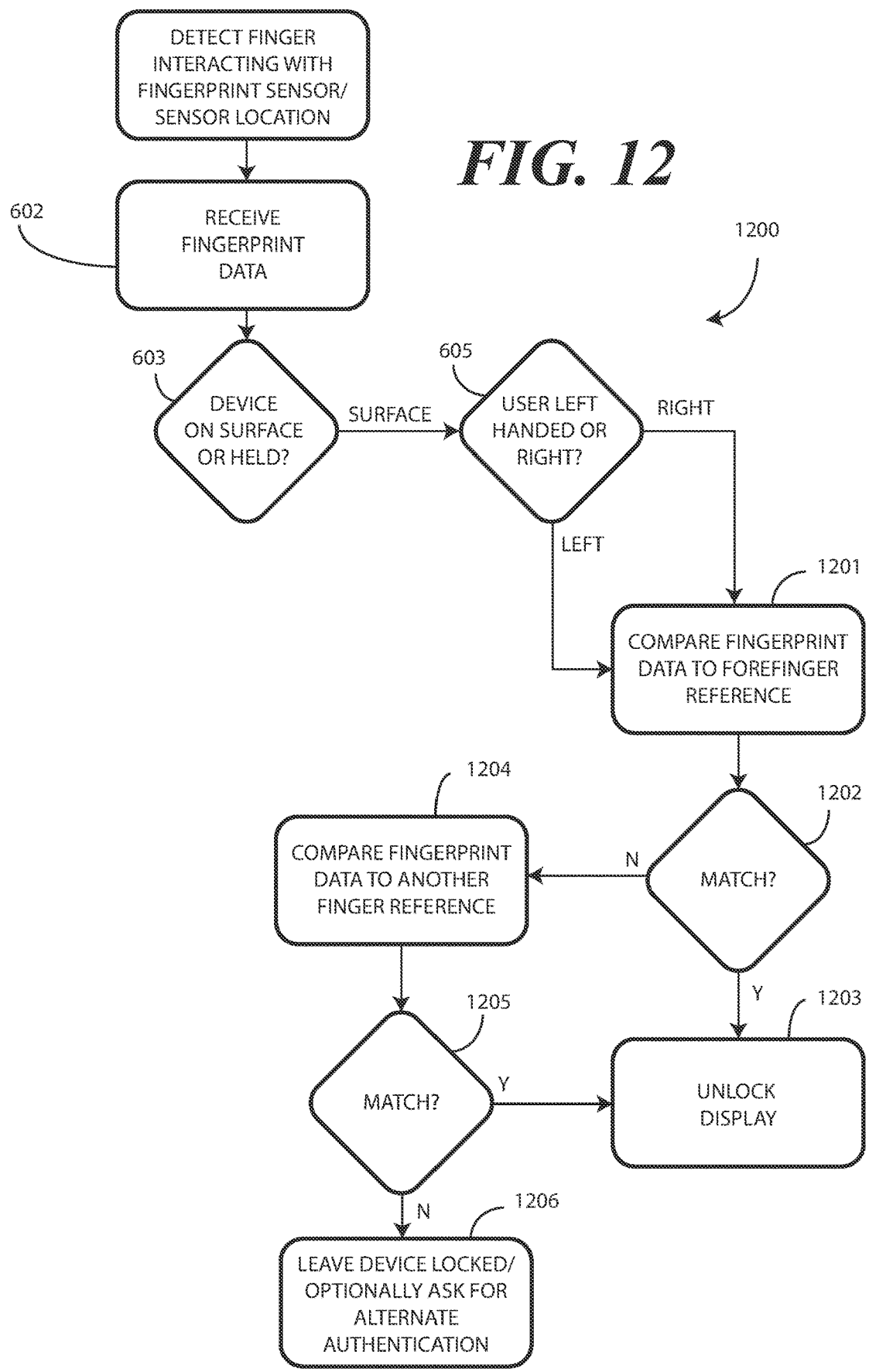
FIG. 12 illustrates another explanatory method in accordance with one or more embodiments of the disclosure.

Turning now to FIG. 12, when decision 603 determines that the mechanical support condition is a surface supported condition with the fingerprint sensor location situated on a front major surface of the electronic device, and decision 605 determines that the handedness of the user is right-handed, the method 1200 moves to step 1201. At step 1201, the one or more processors of the electronic device select a preselected fingerprint reference data file as a function of this mechanical support condition, fingerprint sensor location, and user handedness. In one or more embodiments, the preselected fingerprint reference data file comprises a forefinger fingerprint reference data file.

At step 1201, the one or more processors then compare the fingerprint data received at step 602 with the forefinger fingerprint reference data file before comparing the fingerprint data to any other fingerprint reference data file stored in the memory of the electronic device. In one or more embodiments, step 1201 comprises the one or more processors prioritizing the forefinger fingerprint data by comparing the fingerprint data received at step 602 with the forefinger fingerprint data reference file stored in the memory of the electronic device before comparing the fingerprint data to any other fingerprint reference data files stored in the memory whenever the electronic device is a candy bar device, the fingerprint sensor is situated on the front major surface of the device housing, the device is being supported by a surface, and the authorized user is a right handed user.

If the fingerprint data substantially matches the forefinger fingerprint reference data file, as determined at decision 1202, the one or more processors authenticate the user delivering the fingerprint data at step 602 as the authorized user of the electronic device and unlock the electronic device in response to authenticating the authorized user of the electronic device at step 1203. Otherwise, the method 1100 moves to step 1204 where additional fingerprint reference data files are compared to the fingerprint data until a match is determined at decision 1205. If no match is ever made, the electronic device and its display remain locked at step 1206. The one or more processors can optionally prompt for an alternate authentication credential at step 1206, such as a password, personal identification number, or other credential, in one or more embodiments.

The operation of the method 1200 is the same when the electronic device is being supported by a surface, the fingerprint sensor is situated on the front major surface of the electronic device, and the handedness of the user is left-handed. At step 1201, the one or more processors of the electronic device again select a preselected fingerprint reference data file as a function of this mechanical support condition, fingerprint sensor location, and user handedness. In one or more embodiments, the preselected fingerprint reference data file again comprises a forefinger fingerprint reference data file, albeit a left forefinger rather than the right forefinger that is selected when the handedness of the user is right-handed.

At step 1201, the one or more processors then compare the fingerprint data received at step 602 with the forefinger fingerprint reference data file before comparing the fingerprint data to any other fingerprint reference data file stored in the memory of the electronic device. In one or more embodiments, step 1201 comprises the one or more processors prioritizing the forefinger fingerprint data by comparing the fingerprint data received at step 602 with the forefinger fingerprint data reference file stored in the memory of the electronic device before comparing the fingerprint data to any other fingerprint reference data files stored in the memory whenever the electronic device is a candy bar device, the fingerprint sensor is situated on the front major surface of the device housing, the device is surface supported, and the authorized user is a left handed user.

If the fingerprint data substantially matches the forefinger fingerprint reference data file, as determined at decision 1202, the one or more processors authenticate the user delivering the fingerprint data at step 602 as the authorized user of the electronic device and unlock the electronic device in response to authenticating the authorized user of the electronic device at step 1203. Otherwise, the method 1200 moves to step 1204 where additional fingerprint reference data files are compared to the fingerprint data until a match is determined at decision 1205. If no match is ever made, the electronic device and its displays remain locked at step 1206. The one or more processors can optionally prompt for an alternate authentication credential at step 1206, such as a password, personal identification number, or other credential, in one or more embodiments.

Further illustrations of the methods described above are provided in FIGS. 13-16. These figures are illustrative only, demonstrating the operation of the methods when the device configuration positions the fingerprint sensor on a minor surface of the electronic device. Accordingly, FIGS. 13-16 illustrate graphically the processes performed by the methods of FIGS. 6-8. However, given the descriptions set forth above with reference to FIGS. 6 and 9-12, it is expected that one of ordinary skill, notwithstanding possibly significant effort and many design choices motivated by, for example, available time, current technology, and economic considerations, when guided by the concepts and principles disclosed in FIGS. 13-16 will be readily capable of generating similar diagrams graphically illustrating the processes performed by the methods of FIGS. 6 and 9-12 with minimal experimentation.

Figure 13:
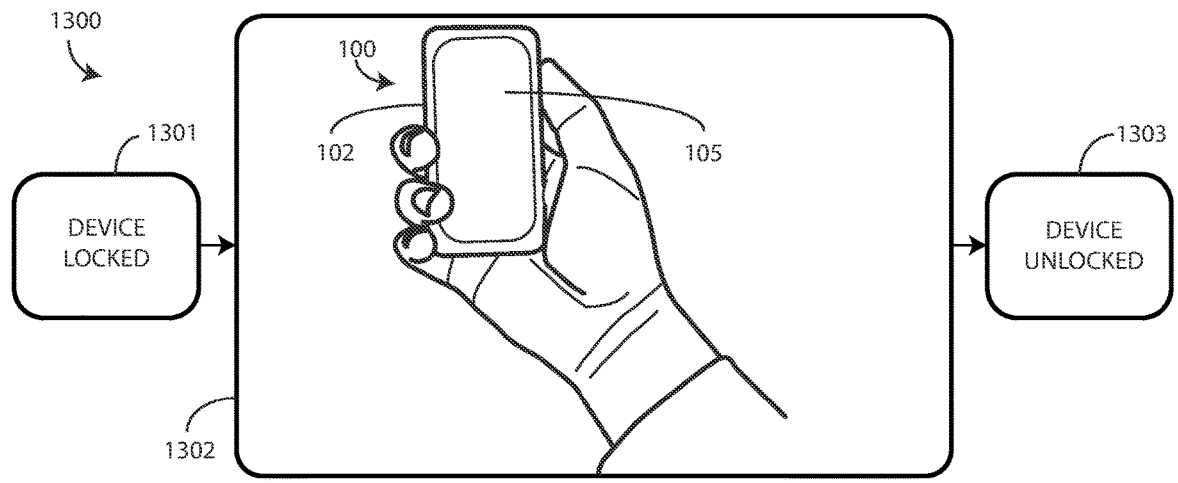
FIG. 13 illustrates one or more method steps in accordance with one or more embodiments of the disclosure.

Beginning with FIG. 13, at step 1301 the electronic device 100 is a candy bar device with a fingerprint sensor situated on a minor surface of the device housing 102. At step 1301 the electronic device 100 is in a hand supported condition and in the locked mode of operation. In one or more embodiments, one or more sensors (115) of the electronic device 100 detect both this device configuration and mechanical support condition at step 1301.

As shown at step 1302, the fingerprint sensor situated on the minor surface of the device housing 102 receives fingerprint data from a right-handed user. The right-handed user applies their thumb to the fingerprint sensor to deliver the fingerprint data.

The electronic device 100 includes a memory (112) storing a plurality of fingerprint reference data files (113). One or more processors (110) of the electronic device select a prioritized fingerprint reference data file from the plurality of fingerprint reference data files (113) as a function of the mechanical support condition, the device configuration, and the handedness of the user. In this illustrative embodiment, the prioritized fingerprint reference data file for the hand-supported electronic device, with its minor surface located fingerprint sensor, and with a right-handed user is the thumb fingerprint reference data file.

The one or more processors (110) then authenticate the authorized user of the electronic device by comparing the fingerprint reference data file to the prioritized fingerprint reference data file before comparing the fingerprint reference data file to any other fingerprint reference data files of the plurality of fingerprint reference data files (113) stored in the memory (112) at step 1302.

At step 1303, the one or more processors (110) transition the electronic device 100 from the locked mode of operation to an active mode of operation. In one or more embodiments, this comprises the one or more processors (110) of the electronic device 100 unlocking display 105 in response to authenticating the authorized user of the electronic device.

Advantageously, the method 1300 depicted in FIG. 13 allows an authorized user of the electronic device to simply touch the fingerprint sensor in a natural way to more quickly unlock the electronic device 100. This quick and seamless process allows the authorized user to view content, messages, files, and data without having to awkwardly pivot the device housing 102 around in their hand.

Figure 14:
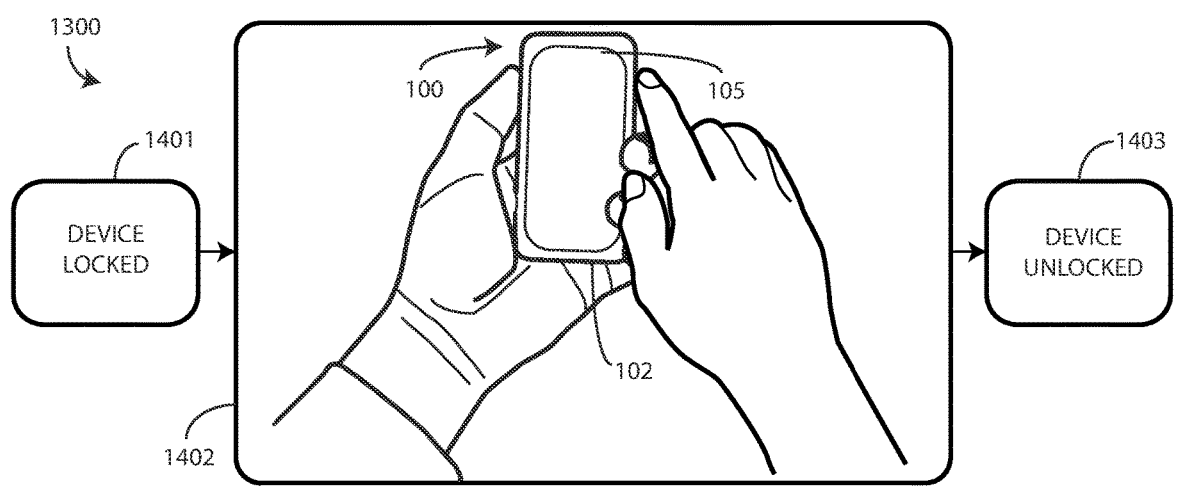
FIG. 14 illustrates one or more method steps in accordance with one or more embodiments of the disclosure.

FIG. 14 contrasts the right-handed user with a left-handed user. At step 1401 the electronic device 100 is again a candy bar device with a fingerprint sensor situated on a minor surface of the device housing 102. At step 1401 the electronic device 100 is in a hand supported condition and in the locked mode of operation. In one or more embodiments, one or more sensors (115) of the electronic device 100 detect both this device configuration and mechanical support condition at step 1401.

As shown at step 1402, the fingerprint sensor situated on the minor surface of the device housing 102 receives fingerprint data from a left-handed user. The left-handed user applies their forefinger to the fingerprint sensor to deliver the fingerprint data since the thumb is situated on the left side of the electronic device 100, while the fingerprint sensor is situated on the right side of the electronic device 100.

One or more processors (110) of the electronic device select a prioritized fingerprint reference data file from the plurality of fingerprint reference data files (113) as a function of the mechanical support condition, the device configuration, and the handedness of the user. In this illustrative embodiment, the prioritized fingerprint reference data file for the hand-supported electronic device, with its minor surface located fingerprint sensor, and with a left-handed user is the forefinger fingerprint reference data file.

The one or more processors (110) then authenticate the authorized user of the electronic device by comparing the fingerprint reference data file to the prioritized fingerprint reference data file before comparing the fingerprint reference data file to any other fingerprint reference data files of the plurality of fingerprint reference data files (113) stored in the memory (112) at step 1402.

At step 1403, the one or more processors (110) transition the electronic device 100 from the locked mode of operation to an active mode of operation. In one or more embodiments, this comprises the one or more processors (110) of the electronic device 100 unlocking display 105 in response to authenticating the authorized user of the electronic device.

Figure 15:
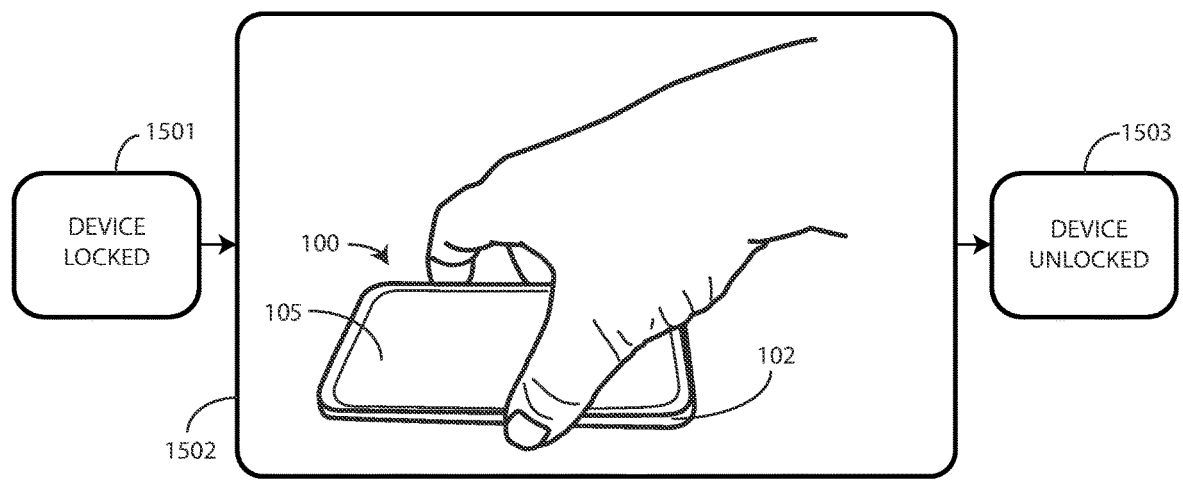
FIG. 15 illustrates one or more method steps in accordance with one or more embodiments of the disclosure.
Figure 16:
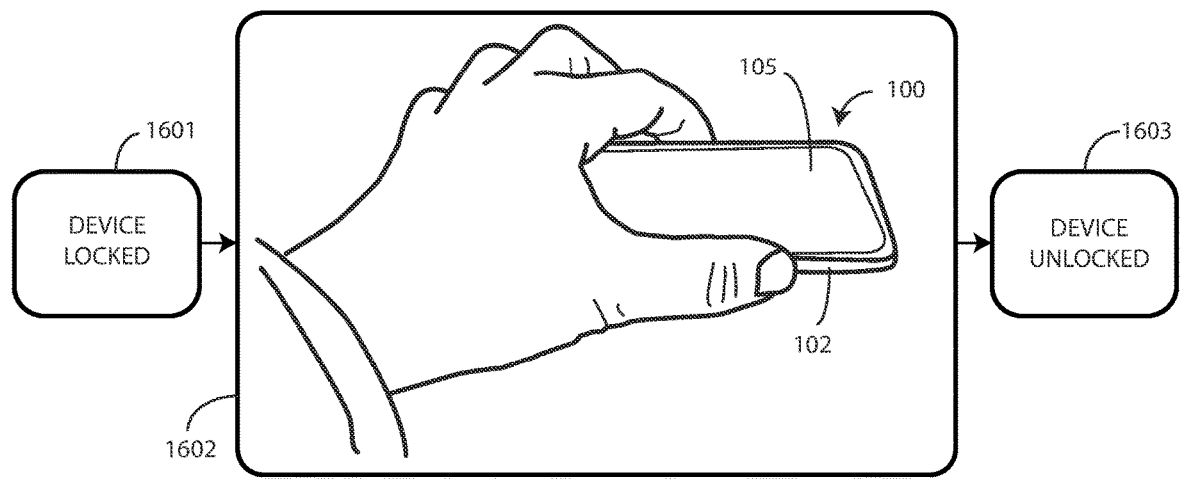
FIG. 16 illustrates one or more method steps in accordance with one or more embodiments of the disclosure.

FIGS. 15-16 illustrate the unlocking operation when the electronic device 100 is supported by a surface. Beginning with FIG. 15, at step 1501 the electronic device 100 is again a candy bar device with a fingerprint sensor situated on a minor surface of the device housing 102. At step 1501 the electronic device 100 is in a surface supported condition and in the locked mode of operation. In one or more embodiments, one or more sensors (115) of the electronic device 100 detect both this device configuration and mechanical support condition at step 1501.

As shown at step 1502, the fingerprint sensor situated on the minor surface of the device housing 102 receives fingerprint data from a right-handed user. The right-handed user applies their forefinger to the fingerprint sensor to deliver the fingerprint data.

The electronic device 100 includes a memory (112) storing a plurality of fingerprint reference data files (113). One or more processors (110) of the electronic device select a prioritized fingerprint reference data file from the plurality of fingerprint reference data files (113) as a function of the mechanical support condition, the device configuration, and the handedness of the user. In this illustrative embodiment, the prioritized fingerprint reference data file for the surface-supported electronic device, with its minor surface located fingerprint sensor, and with a right-handed user is the forefinger fingerprint reference data file.

The one or more processors (110) then authenticate the authorized user of the electronic device by comparing the fingerprint reference data file to the prioritized fingerprint reference data file before comparing the fingerprint reference data file to any other fingerprint reference data files of the plurality of fingerprint reference data files (113) stored in the memory (112) at step 1502.

At step 1503, the one or more processors (110) transition the electronic device 100 from the locked mode of operation to an active mode of operation. In one or more embodiments, this comprises the one or more processors (110) of the electronic device 100 unlocking display 105 in response to authenticating the authorized user of the electronic device.

FIG. 16 contrasts the right-handed user of FIG. 15 with a left-handed user. At step 1601 the electronic device 100 is again a candy bar device with a fingerprint sensor situated on a minor surface of the device housing 102. At step 1601 the electronic device 100 is in a surface supported condition and in the locked mode of operation. In one or more embodiments, one or more sensors (115) of the electronic device 100 detect both this device configuration and mechanical support condition at step 1601.

As shown at step 1602, the fingerprint sensor situated on the minor surface of the device housing 102 receives fingerprint data from a left-handed user. The left-handed user applies their thumb to the fingerprint sensor to deliver the fingerprint data since the thumb is situated on the same side of the electronic device 100 as the fingerprint sensor.

One or more processors (110) of the electronic device select a prioritized fingerprint reference data file from the plurality of fingerprint reference data files (113) as a function of the mechanical support condition, the device configuration, and the handedness of the user. In this illustrative embodiment, the prioritized fingerprint reference data file for the surface-supported electronic device, with its minor surface located fingerprint sensor, and with a left-handed user is the thumb fingerprint reference data file.

The one or more processors (110) then authenticate the authorized user of the electronic device by comparing the fingerprint reference data file to the prioritized fingerprint reference data file before comparing the fingerprint reference data file to any other fingerprint reference data files of the plurality of fingerprint reference data files (113) stored in the memory (112) at step 1602.

At step 1603, the one or more processors (110) transition the electronic device 100 from the locked mode of operation to an active mode of operation. In one or more embodiments, this comprises the one or more processors (110) of the electronic device 100 unlocking display 105 in response to authenticating the authorized user of the electronic device.

Figure 17:
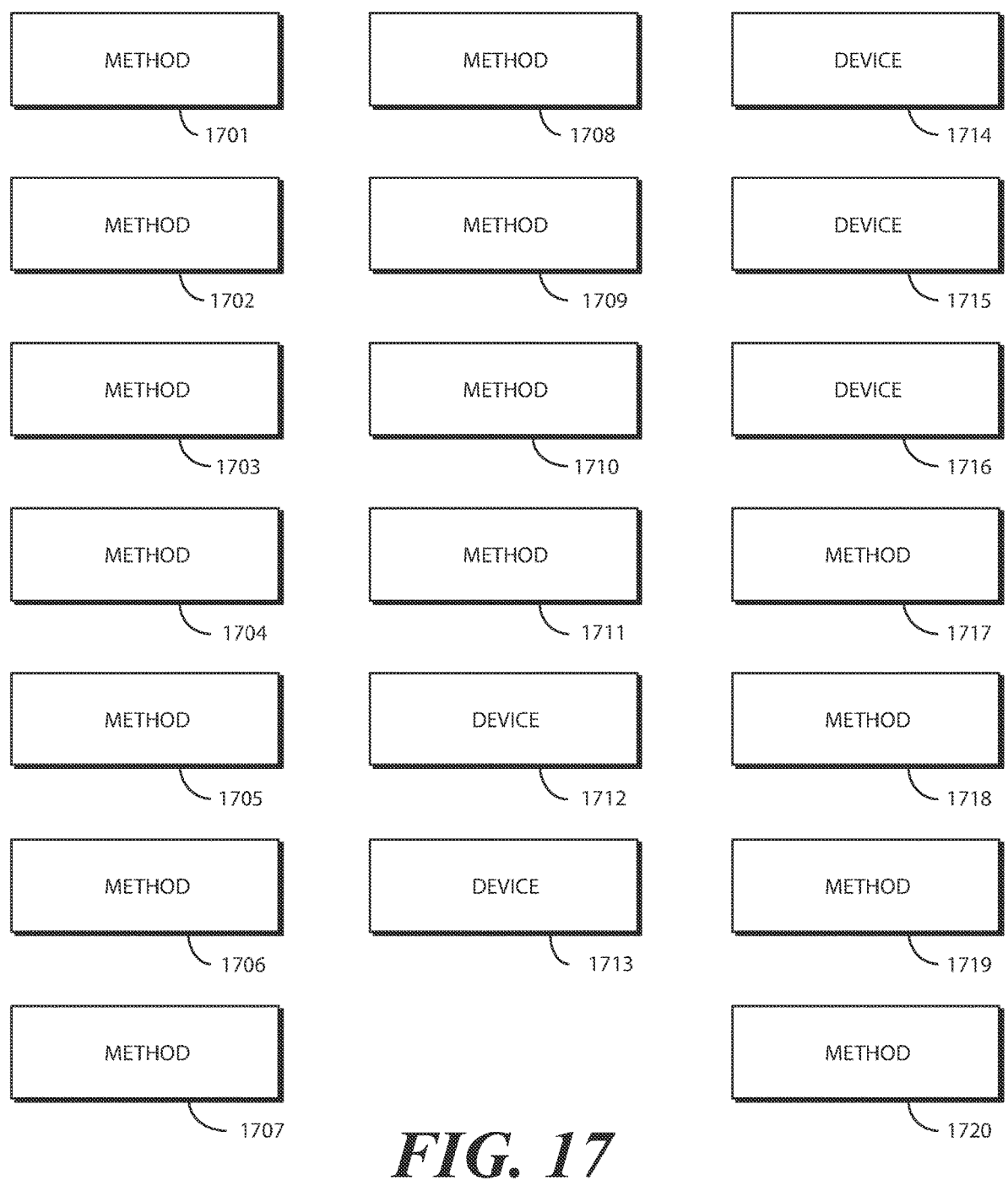
FIG. 17 illustrates one or more embodiments of the disclosure.

Turning now to FIG. 17, illustrated therein are various embodiments of the disclosure. The embodiments of FIG. 17 are shown as labeled boxes in FIG. 17 due to the fact that the individual components of these embodiments have been illustrated in detail in FIGS. 1-16, which precede FIG. 17. Accordingly, since these items have previously been illustrated and described, their repeated illustration is no longer essential for a proper understanding of these embodiments. Thus, the embodiments are shown as labeled boxes.

At 1701, a method in an electronic device, comprises detecting a mechanical support condition of the electronic device with one or more sensors. At 1701, the method comprises receiving fingerprint data with a fingerprint sensor of the electronic device while in the mechanical support condition.

At 1701, the method comprises authenticating an authorized user of the electronic device with one or more processors by comparing the fingerprint data to a preselected fingerprint data reference file, stored in a memory of the electronic device and selected as a function of the mechanical support condition, before comparing the fingerprint data to other fingerprint reference data files stored in the memory. At 1701, the method comprises unlocking the electronic device in response to authenticating the authorized user of the electronic device.

At 1702, the electronic device of 1701 comprises a device housing and a display spanning a major surface of the device housing. At 1702, the fingerprint sensor is situated on a minor surface of the device housing.

At 1703, the method of 1702 further comprises determining a handedness of an authorized user of the electronic device with the one or more sensors. At 1703, the preselected fingerprint reference data file is further selected as a function of the handedness.

At 1704, the mechanical support condition of 1703 comprises a surface supported condition, the handedness comprising right-handedness. At 1704, the preselected fingerprint data reference file comprises a forefinger reference data file.

At 1705, the mechanical support condition of 1703 comprises a hand supported condition, and the handedness comprises right-handedness. At 1705, the preselected fingerprint data reference file comprises a forefinger reference data file.

At 1706, the mechanical support condition of 1703 comprises a surface supported condition, and the handedness comprises left-handedness. At 1706, the preselected fingerprint data reference file comprises a thumb reference data file.

At 1707, the mechanical support condition of 1703 comprises a hand supported condition, and the handedness comprises left-handedness. At 1707, the preselected fingerprint data reference file comprises a forefinger reference data file.

At 1708, the fingerprint sensor of 1701 is situated on another major surface of the device housing separated from the major surface of the device housing by at least one minor surface of the device housing. At 1708, the fingerprint sensor is situated in a central location along the other major surface. At 1708, the mechanical support condition comprises a hand supported condition, and the preselected fingerprint data reference file comprises a forefinger reference data file.

At 1709, the fingerprint sensor of 1701 is situated on another major surface of the device housing separated from the major surface of the device housing by at least one minor surface of the device housing. At 1709, the fingerprint sensor is situated in an edge location along the other major surface. At 1709, the mechanical support condition comprises a surface supported condition, and the preselected fingerprint data reference file comprises a forefinger reference data file.

At 1710, the fingerprint sensor of 1701 is situated on another major surface of the device housing separated from the major surface of the device housing by at least one minor surface of the device housing. At 1710, the fingerprint sensor is situated in an edge location along the other major surface. At 1710, the mechanical support condition comprises a hand supported condition, and the preselected fingerprint data reference file comprises a thumb reference data file.

At 1711, the method of 1701 further comprises completing with the one or more processors an enrollment process receiving reference fingerprint data at the fingerprint sensor and storing the reference fingerprint data as fingerprint reference data files in a memory of the electronic device. At 1711, the fingerprint data corresponds to at least two fingers of the authorized user, and the fingerprint reference data files comprising at least two fingerprint reference data files.

At 1712, an electronic device comprises a memory storing a plurality of fingerprint reference data files. At 1712, the electronic device comprises one or more sensors identifying whether a mechanical support condition of the electronic device is a hand supported condition or a surface supported condition.

At 1712, the electronic device comprises a fingerprint sensor receiving fingerprint data. At 1712, one or more processors selects a prioritized fingerprint data reference file from the plurality of fingerprint reference data files as a function of the mechanical support condition and authenticates an authorized user of the electronic device by comparing the fingerprint data to the prioritized fingerprint data reference file before comparing the fingerprint data to another fingerprint reference data file of the plurality of fingerprint reference data files.

At 1713, the electronic device of 1712 further comprises a device housing. At 1713, the fingerprint sensor is situated on a minor face of the device housing. At 1713, the one or more sensors further identify a handedness of the authorized user and the one or more processors further select the prioritized fingerprint data reference file as a function of the handedness.

At 1714, the one or more processors of 1713 unlock the electronic device in response to authenticating the authorized user of the electronic device. At 1715, the one or more processors of 1714 select the prioritized fingerprint data reference file as a function of a physical location of the fingerprint sensor on the electronic device. At 1716, the prioritized fingerprint reference data file of 1715 comprises one of a forefinger fingerprint reference data file or a thumb fingerprint reference data file.

At 1717, a method in an electronic device comprises enrolling, with a fingerprint sensor, fingerprint data corresponding to at least two fingers of an authorized user of the electronic device by storing, with one or more processors, the fingerprint data as at least two fingerprint reference data files in a memory of the electronic device. At 1717, the method comprises determining, with one or more sensors, a mechanical support condition of the electronic device.

At 1717, the method comprises determining, with the one or more sensors, a physical location of the fingerprint sensor on the electronic device. At 1717, the method comprises receiving additional fingerprint data with the fingerprint sensor while the electronic device is in the mechanical support condition.

At 1717, the method comprises selecting, by the one or more processors as a function of the mechanical support condition and the physical location of the fingerprint sensor, one fingerprint reference data file of the at least two fingerprint reference data files as a selected fingerprint reference data file. At 1717, the method comprises authenticating the authorized user of the electronic device by comparing, with the one or more processors, the additional fingerprint data to the selected fingerprint data reference file before comparing the fingerprint data to any other fingerprint reference data file stored in the memory.

At 1718, the enrolling of 1717 comprises determining, by the one or more processors, a device category of the electronic device and a handedness of the authorized user. At 1718, the enrolling comprises identifying, by the one or more processors, at least two fingerprint reference data file types as a function of the device category and the handedness of the authorized user. At 1718, the enrolling comprises detecting, by the one or more processors, enrollment of a first fingerprint reference data file type of the at least two fingerprint reference data file types. At 1718, the enrolling comprises prompting, at a user interface of the electronic device by the one or more processors, for enrollment of at least one other fingerprint reference data file type of the at least to fingerprint reference data file types before terminating the enrolling.

At 1719, the device category of 1718 comprises one of a candy bar device or a clamshell device, the handedness being one of left handedness or right handedness. At 1720, the physical location of 1718 comprises one of a minor surface location, a central major surface location, or an edge major surface location.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
    detecting a mechanical support condition of the electronic device with one or more sensors;
    receiving fingerprint data with a fingerprint sensor of the electronic device while in the mechanical support condition;
    authenticating an authorized user of the electronic device with one or more processors by comparing the fingerprint data to a preselected fingerprint data reference file, stored in a memory of the electronic device and selected as a function of the mechanical support condition, before comparing the fingerprint data to other fingerprint reference data files stored in the memory; and
    unlocking the electronic device in response to authenticating the authorized user of the electronic device.

2. The method of claim 1, the electronic device comprising a device housing and a display spanning a major surface of the device housing, wherein the fingerprint sensor is situated on a minor surface of the device housing.

3. The method of claim 2, further comprising determining a handedness of an authorized user of the electronic device with the one or more sensors, wherein the preselected fingerprint reference data file is further selected as a function of the handedness.

4. The method of claim 3, the mechanical support condition comprising a surface supported condition, the handedness comprising right-handedness, the preselected fingerprint data reference file comprising a forefinger reference data file.

5. The method of claim 3, the mechanical support condition comprising a hand supported condition, the handedness comprising right-handedness, the preselected fingerprint data reference file comprising a forefinger reference data file.

6. The method of claim 3, the mechanical support condition comprising a surface supported condition, the handedness comprising left-handedness, the preselected fingerprint data reference file comprising a thumb reference data file.

7. The method of claim 3, the mechanical support condition comprising a hand supported condition, the handedness comprising left-handedness, the preselected fingerprint data reference file comprising a forefinger reference data file.

8. The method of claim 2, wherein the fingerprint sensor is situated on another major surface of the device housing separated from the major surface of the device housing by at least one minor surface of the device housing and in a central location along the another major surface, the mechanical support condition comprising a hand supported condition, the preselected fingerprint data reference file comprising a forefinger reference data file.

9. The method of claim 2, wherein the fingerprint sensor is situated on another major surface of the device housing separated from the major surface of the device housing by at least one minor surface of the device housing and in an edge location along the another major surface, the mechanical support condition comprising a surface supported condition, the preselected fingerprint data reference file comprising a forefinger reference data file.

10. The method of claim 2, wherein the fingerprint sensor is situated on another major surface of the device housing separated from the major surface of the device housing by at least one minor surface of the device housing and in an edge location along the another major surface, the mechanical support condition comprising a hand supported condition, the preselected fingerprint data reference file comprising a thumb reference data file.

11. The method of claim 1, further comprising completing with the one or more processors an enrollment process receiving reference fingerprint data at the fingerprint sensor and storing the reference fingerprint data as fingerprint reference data files in a memory of the electronic device, the fingerprint data corresponding to at least two fingers of the authorized user, the fingerprint reference data files comprising at least two fingerprint reference data files.

12. An electronic device, comprising:
    a memory storing a plurality of fingerprint reference data files;
    one or more sensors identifying whether a mechanical support condition of the electronic device is a hand supported condition or a surface supported condition;
    a fingerprint sensor receiving fingerprint data; and
    one or more processors selecting a prioritized fingerprint data reference file from the plurality of fingerprint reference data files as a function of the mechanical support condition and authenticating an authorized user of the electronic device by comparing the fingerprint data to the prioritized fingerprint data reference file before comparing the fingerprint data to any other fingerprint reference data files of the plurality of fingerprint reference data files.

13. The electronic device of claim 12, the electronic device comprising a device housing, wherein the fingerprint sensor is situated on a minor face of the device housing, the one or more sensors further identifying a handedness of the authorized user, the one or more processors further selecting the prioritized fingerprint data reference file as a function of the handedness.

14. The electronic device of claim 13, the one or more processors further selecting the prioritized fingerprint data reference file as a function of a geometric form factor of the electronic device.

15. The electronic device of claim 14, the one or more processors further selecting the prioritized fingerprint data reference file as a function of a physical location of the fingerprint sensor on the electronic device, wherein the physical location is one of a minor surface of the electronic device with the fingerprint sensor integrated into a user interface component or on a rear surface of the electronic device.

16. The electronic device of claim 15, the prioritized fingerprint reference data file comprising a single, preselected fingerprint data reference file.

17. A method in an electronic device, the method comprising:
- enrolling, with a fingerprint sensor, fingerprint data corresponding to at least two fingers of an authorized user of the electronic device by storing, with one or more processors, the fingerprint data as at least two fingerprint reference data files in a memory of the electronic device;
- determining, with one or more sensors, a mechanical support condition of the electronic device;
- determining, with the one or more sensors, a physical location of the fingerprint sensor on the electronic device;
- receiving additional fingerprint data with the fingerprint sensor while the electronic device is in the mechanical support condition;
- selecting, by the one or more processors as a function of the mechanical support condition and the physical location of the fingerprint sensor, one fingerprint reference data file of the at least two fingerprint reference data files as a selected fingerprint reference data file; and
- authenticating the authorized user of the electronic device by comparing, with the one or more processors, the additional fingerprint data to the selected fingerprint data reference file before comparing the fingerprint data to any other fingerprint reference data file stored in the memory.

18. The method of claim 17, the enrolling comprising:
- determining, by the one or more processors, a device category of the electronic device and a handedness of the authorized user;
- identifying, by the one or more processors, at least two fingerprint reference data file types as a function of the device category and the handedness of the authorized user;
- detecting, by the one or more processors, enrollment of a first fingerprint reference data file type of the at least two fingerprint reference data file types; and
- prompting, at a user interface of the electronic device by the one or more processors, for enrollment of at least one other fingerprint reference data file type of the at least to fingerprint reference data file types before terminating the enrolling.

19. The method of claim 18, the device category comprising one of a candy bar device or a clamshell device, the handedness being one of left handedness or right handedness.

20. The method of claim 18, the physical location comprising one of a minor surface location, a central major surface location, or an edge major surface location.

* * * * *